US012185153B2

(12) United States Patent
Hande et al.

(10) Patent No.: US 12,185,153 B2
(45) Date of Patent: Dec. 31, 2024

(54) PEAK TRAFFIC POSITION ADJUSTMENT FOR WIRELESS COMMUNICATION

(71) Applicant: QUALCOMM Incorporated, San Diego, CA (US)

(72) Inventors: Prashanth Haridas Hande, San Diego, CA (US); Jay Kumar Sundararajan, San Diego, CA (US); Hyun Yong Lee, San Diego, CA (US); Ravi Agarwal, San Diego, CA (US); Peerapol Tinnakornsrisuphap, San Diego, CA (US); Mickael Mondet, Louannec (FR)

(73) Assignee: QUALCOMM Incorporated, San Diego, CA (US)

( * ) Notice: Subject to any disclaimer, the term of this patent is extended or adjusted under 35 U.S.C. 154(b) by 220 days.

(21) Appl. No.: 17/571,274

(22) Filed: Jan. 7, 2022

(65) Prior Publication Data
US 2023/0224723 A1    Jul. 13, 2023

(51) Int. Cl.
*H04L 43/067* (2022.01)
*H04L 43/16* (2022.01)
(Continued)

(52) U.S. Cl.
CPC ....... *H04W 28/0247* (2013.01); *H04L 43/067* (2013.01); *H04L 43/16* (2013.01);
(Continued)

(58) Field of Classification Search
CPC ....... H04L 43/02–55; H04L 47/10–83; H04W 8/22–245; H04W 16/02–225;
(Continued)

(56) References Cited

U.S. PATENT DOCUMENTS

| 8,818,392 B2 | 8/2014 | Chetlur et al. |
| 2014/0369296 A1* | 12/2014 | Breuer ................. H04W 72/12 370/329 |

(Continued)

FOREIGN PATENT DOCUMENTS

| EP | 3793248 A1 | 3/2021 | |
| WO | WO-2017045229 A1 * | 3/2017 | ............ H04W 28/10 |

(Continued)

OTHER PUBLICATIONS

International Search Report and Written Opinion—PCT/US2022/080929—ISA/EPO—Mar. 22, 2023 (2108450WO).

*Primary Examiner* — Timothy J Weidner
(74) *Attorney, Agent, or Firm* — Holland & Hart LLP

(57) ABSTRACT

Methods, systems, and devices for wireless communication are described. A network node may determine a first time location associated with a peak in data traffic for multiple devices in communication with a communications network including the network node. The network node may determine a second time location for the peak in the data traffic for a subset of the devices based on a threshold for an overall peak in data traffic for the multiple devices. The network node may transmit a signal that indicates the second time location for the peak in the data traffic for the subset of devices. The network node may communicate the data with the subset of devices based on the signal indicating the second time location.

27 Claims, 20 Drawing Sheets

(51) Int. Cl.
H04W 16/22 (2009.01)
H04W 24/08 (2009.01)
H04W 24/10 (2009.01)
H04W 28/02 (2009.01)
H04W 28/08 (2023.01)
H04W 28/12 (2009.01)
H04W 56/00 (2009.01)
H04W 72/0446 (2023.01)
H04W 72/121 (2023.01)
H04W 76/15 (2018.01)
H04W 84/02 (2009.01)
H04W 88/02 (2009.01)
H04W 88/08 (2009.01)
H04W 88/12 (2009.01)
H04W 92/02 (2009.01)
H04W 92/10 (2009.01)
H04W 92/12 (2009.01)

(52) U.S. Cl.
CPC ........... *H04W 16/22* (2013.01); *H04W 24/08* (2013.01); *H04W 24/10* (2013.01); *H04W 28/0268* (2013.01); *H04W 28/0273* (2013.01); *H04W 28/0284* (2013.01); *H04W 28/0908* (2020.05); *H04W 28/0942* (2020.05); *H04W 28/0967* (2020.05); *H04W 28/0992* (2020.05); *H04W 28/12* (2013.01); *H04W 56/001* (2013.01); *H04W 72/0446* (2013.01); *H04W 72/121* (2013.01); *H04W 76/15* (2018.02); H04W 84/02 (2013.01); H04W 88/02 (2013.01); H04W 88/08 (2013.01); H04W 88/12 (2013.01); H04W 92/02 (2013.01); H04W 92/10 (2013.01); H04W 92/12 (2013.01)

(58) Field of Classification Search
CPC ..... H04W 24/02–10; H04W 28/02–26; H04W 48/02–20; H04W 56/0005–0095; H04W 72/02–569; H04W 74/002–0891; H04W 76/10–50; H04W 84/005–22; H04W 88/005–188; H04W 92/02–24
See application file for complete search history.

(56) References Cited

U.S. PATENT DOCUMENTS

| 2016/0135077 A1* | 5/2016 | Streijl | H04W 72/52 370/230 |
|---|---|---|---|
| 2024/0056889 A1* | 2/2024 | Xu | H04W 28/0268 |

FOREIGN PATENT DOCUMENTS

| WO | WO-2021002784 A1 * | 1/2021 | ............ H04W 72/04 |
| WO | WO-2022067700 A1 * | 4/2022 | ............ H04W 72/04 |

* cited by examiner

PEAK TRAFFIC POSITION ADJUSTMENT FOR WIRELESS COMMUNICATION

FIELD OF TECHNOLOGY

The following relates to wireless communication, including peak traffic position adjustment for wireless communication.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

In some wireless communications systems, a network may communicate uplink data, downlink data, or both with multiple UEs. The data traffic for each UE may, in some cases, include one or more peaks or bursts associated with a relatively large quantity of bits of data being communicated at a time.

SUMMARY

The described techniques relate to improved methods, systems, devices, and apparatuses that support peak traffic position adjustment for wireless communication. Generally, the described techniques provide for a network node to adjust a time at which a peak in data traffic occurs for a subset of users supported by the network. The peak in the data traffic may correspond to a quantity of bits of the data traffic that is greater than quantities of bits of the data traffic at other times. The network node may offset the time at which the peaks occur to reduce a total quantity of bits of the data traffic at a time, which may provide for the network to support improved communication reliability and quality of service (QOS) parameters for each user. The network node may determine a first time associated with a first peak in data traffic that corresponds to a first quantity of bits of data for the multiple devices exceeding a threshold value. The network node may determine the first time based on communicating the data with the devices or based on an indication received via signaling from a logical entity of the network. In some examples, a device, such as a user equipment (UE) or an application client may determine the first time based on communicating data or based on an indication received from an application server. The device may transmit an indication of the first time to the network node. The network node may determine a second time associated with the first peak in the data traffic and that corresponds to a second quantity of bits of the data for the device or a subset of the devices. The second quantity of bits may be less than a threshold value and may satisfy QoS parameters for the subset of devices. The network node may determine an offset between the first time and the second time based on communication parameters associated with the subset of devices.

The network node may transmit a signal to a logical entity of the network, such as an edge server or a data network, to indicate the second time for the subset of devices. In some examples, the network node may transmit the signal indicating the second time to the UE, the application client, or both (e.g., via an application program interface (API)). The signal may indicate the second time, the offset between the first time and the second time, a periodicity associated with the second quantity of bits, the subset of devices associated with the second time, or any combination thereof. In some examples, the network node may transmit the signal to one or more of the devices (e.g., application clients). The network node may communicate the data with the subset of devices based on the second time indicated via the signal. For example, a second quantity of bits of the data for the subset of devices at the second time may be greater than a third quantity of bits of the data for the subset of devices at a third time. That is, the second time may be associated with an adjusted timing of the first peak in the data for the subset of devices that is offset from the first time at which there is a peak in the data for one or more other devices. The offset between peaks may support improved communication reliability and reduced latency for the devices.

DETAILED DESCRIPTION

Figure 1:
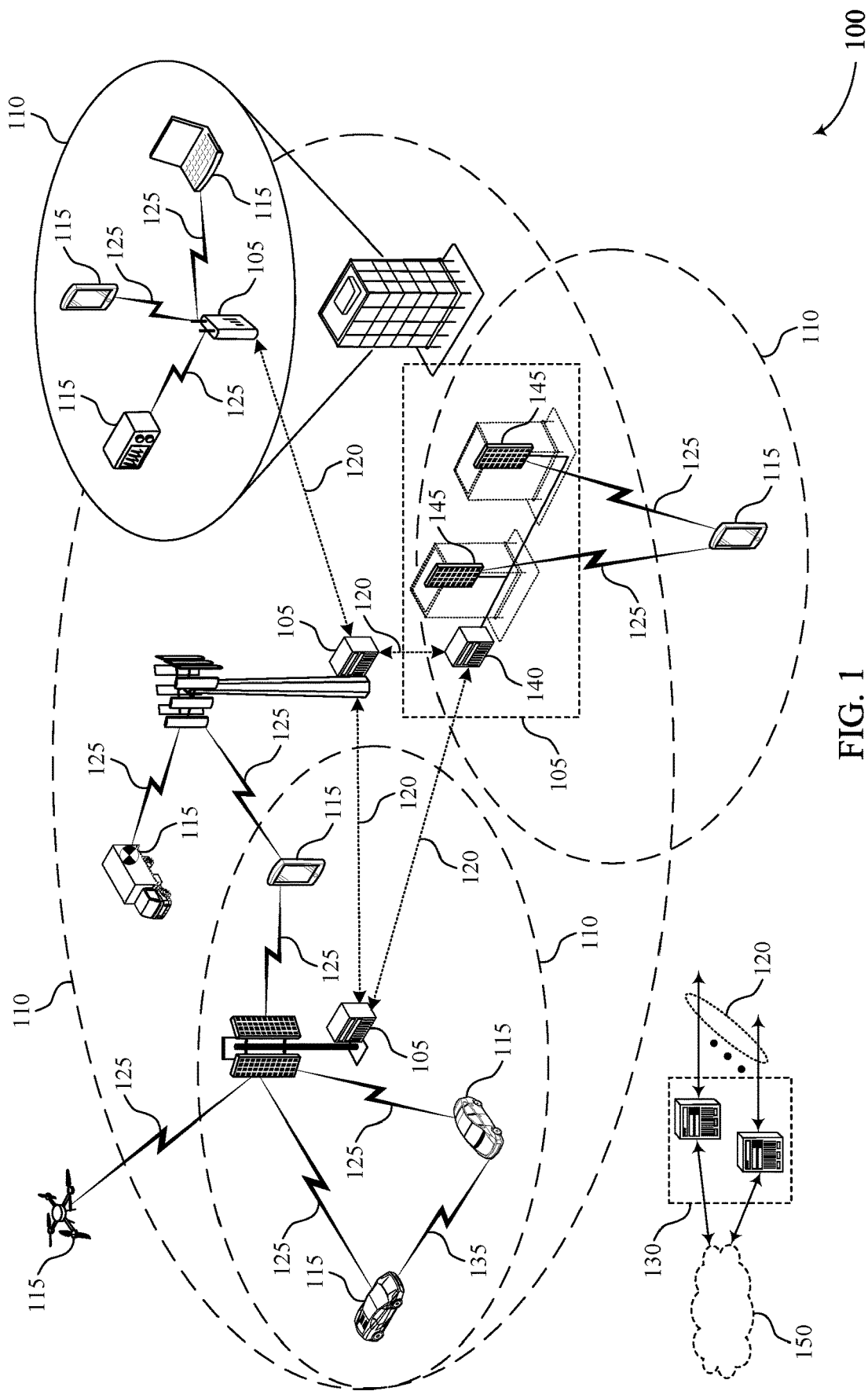
FIG. 1 illustrates an example of a wireless communications system that supports peak traffic position adjustment for wireless communication in accordance with aspects of the present disclosure.

Some wireless communications systems may support relatively low-latency applications, such as extended reality (XR) applications. Such applications may be associated with relatively low latency uplink or downlink video traffic or other data traffic. Such data traffic may be transmitted periodically or semi-periodically in bursts, such as per frame. A burst of data traffic may be referred to as a peak, and may correspond to a time at which a quantity of bits of the data traffic being transferred is a maximum quantity (e.g., higher than other quantities of bits of the data traffic at other times). Additionally or alternatively, a peak in data traffic may correspond to a time at which a quantity of bits of the data traffic being transferred is greater than a threshold quantity. In some examples, the threshold quantity may be based on a maximum data burst volume (MDBV) parameter for the data traffic. The MDBV parameter may be configured for or associated with a quality of service (QOS) flow via which the data traffic is communicated. The MDBV may indicate a quantity of bits of data transfer that the network supports at a time.

Each QoS flow may additionally or alternatively support one or more other QoS parameters, such as a packet delay budget (PDB), a packet error rate (PER), or both. If an amount of data being transmitted at a given time is less than the MDBV, the network may communicate the data traffic in accordance with the QoS parameters. The quantity of bits of the data traffic may, in some cases, exceed the MDBV if the network supports low-latency data traffic for multiple users. For example, one or more peaks in the data traffic for each user may overlap or collide, such that a total data volume exceeds the MDBV. If the quantity of bits of the data traffic exceeds the MDBV at a given time, the network may not be able to satisfy the QoS parameters for each user.

Techniques described herein provide for a network node, such as a base station, or some other node of a radio access network (RAN), to adjust a time location at which a peak in data traffic occurs for one or more users, which may reduce a total quantity of bits of data communicated by the network at a time. By adjusting the data traffic peaks, a total quantity of bits may not exceed a configured MDBV, such that the network may ensure that QoS parameters for each user are satisfied. The network node may determine an initial time location at which one or more bursts or peaks of the data traffic occur for each user by monitoring a data flow for multiple users or based on an indication conveyed via a QoS request. The network node may receive the QoS request message from an edge server or a data network to establish a connection and initiate communications using one or more QoS flows. In some examples, a device (e.g., a user equipment (UE) or an application client, or both) in communication with the network node may determine the initial timing of the one or more peaks based on communicating the data or based on an indication received from an application server. The device may transmit an indication of the initial timing to the network node. If a quantity of bits to be communicated at an identified time exceeds a threshold amount for an overall peak in the data traffic for the devices (e.g., the MDBV), the network node may determine to adjust a timing of the peak in data traffic for at least a subset of the users. The network node may determine a second time location at which the one or more peaks may occur for the subset of the users. The second time location may be offset from the initial time location of the peak for multiple users by an offset value. The network node may determine the subset of users, the offset value, or both based on communication parameters associated with the users.

The network node may transmit an indication of the offset value, which may be referred to as an offset to peak parameter, to a data network or to an edge server via a network exposure function (NEF) interface or some other interface between the data network and the network node. If the edge server (e.g., an access function (AF)) receives the offset to peak parameter, the edge server may forward the indication to the data network. The data network may adjust a data traffic flow for the subset of users according to the offset. In some examples, the network node may transmit an indication of the offset value to a UE, which may forward the indication to an application client, a corresponding application server, or both via an application program interface (API). The network node, the application client, or the application server may adjust the data traffic for the application client according to the offset. Adjusting the data traffic flow may include adjusting a timing of the data traffic such that a peak in the data traffic for the subset of users or for the application client may occur at the second time location based on the indicated offset value. Stated alternatively, a quantity of bits of data transferred at the second time location may be greater than a quantity of bits of the data transferred at other times. The data traffic may be downlink data traffic or uplink data traffic.

Particular aspects of the subject matter described herein may be implemented to realize one or more of the following potential advantages. By adjusting a timing of a peak in data traffic for one or more users, a network node may reduce a total quantity of bits of data communicated at a time, which may improve communication reliability and reduce latency. For example, the network node may satisfy QoS parameters for each user by adjusting the peak timing. The network node may thereby support efficient and reliable communications for more users than if the network node does not adjust the timing of the peaks in the data traffic. In some examples, the network node may determine the subset of users based on one or more communication parameters associated with the subset of users, such as a link condition of the subset of users, which may provide for improved communication reliability for the subset of users. The network node may receive signaling that indicates an initial timing of the peaks in the data traffic, which may improve coordination between devices, reduce latency, and reduce processing by the network node. Alternatively, the network node may determine the initial timing of the peaks in the data traffic by monitoring the data traffic, which may reduce overhead.

Aspects of the disclosure are initially described in the context of wireless communications systems. Additional aspects are described with reference to communications timelines, process flows, signaling paths, and flow diagrams. Aspects of the disclosure are further illustrated by and described with reference to apparatus diagrams, system diagrams, and flowcharts that relate to peak traffic position adjustment for wireless communication.

FIG. 1 illustrates an example of a wireless communications system 100 that supports peak traffic position adjustment for wireless communication in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

In some examples, one or more components of the wireless communications system 100 may operate as or be referred to as a network node. As used herein, a network node may refer to any UE 115, base station 105, entity of a core network 130, apparatus, device, or computing system configured to perform any techniques described herein. For example, a network node may be a UE 115. As another example, a network node may be a base station 105. As another example, a first network node may be configured to communicate with a second network node or a third network node. In one aspect of this example, the first network node may be a UE 115, the second network node may be a base station 105, and the third network node may be a UE 115. In another aspect of this example, the first network node may be a UE 115, the second network node may be a base station 105, and the third network node may be a base station 105.

In yet other aspects of this example, the first, second, and third network nodes may be different. Similarly, reference to a UE 115, a base station 105, an apparatus, a device, or a computing system may include disclosure of the UE 115, base station 105, apparatus, device, or computing system being a network node. For example, disclosure that a UE 115 is configured to receive information from a base station 105 also discloses that a first network node is configured to receive information from a second network node. In this example, consistent with this disclosure, the first network node may refer to a first UE 115, a first base station 105, a first apparatus, a first device, or a first computing system configured to receive the information; and the second network node may refer to a second UE 115, a second base station 105, a second apparatus, a second device, or a second computing system The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s = 1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (STTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrow band IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrow band communications), or a combination of these techniques. For example, some UEs 115 may be configured for operation using a narrow band protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHZ.

The wireless communications system 100 may also operate in a super high frequency (SHF) region using frequency bands from 3 GHz to 30 GHZ, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHZ industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

In the wireless communications system 100, the core network 130 may support communications with multiple UEs 115 via one or more network nodes or other network entities, such as a base station 105. As described herein, a network node may adjust a time at which a peak in data traffic occurs for a subset of the UEs 115 supported by the core network 130. The peak in the data traffic may correspond to a quantity of bits of the data traffic being greater than quantities of bits of the data traffic at other times. The network node may offset a time at which a peak occurs to reduce a total quantity of bits of the data traffic at a time, which may provide for the network to support improved communication reliability and QoS parameters for each UE 115. The network node may determine a first time at which a first quantity of bits of data for the multiple UEs 115 exceeds a threshold value. The network node may determine the first time based on communicating the data with the UEs 115 or based on an indication received via signaling from a logical entity of the core network 130. The network node may determine a second time that corresponds to a second quantity of bits of the data for a subset of the UEs 115. The second quantity of bits may be less than a threshold value and may satisfy QoS parameters for the subset of UEs 115. The network node may determine an offset between the first time and the second time based on communication parameters associated with the subset of UEs 115.

The network node may transmit a signal to a logical entity of the network, such as an edge server or a data network, to indicate the second time for the subset of UEs 115. The signal may indicate the second time, the offset between the first time and the second time, a periodicity associated with the second quantity of bits, the subset of devices associated with the second time, or any combination thereof. In some examples, the network node may transmit the signal to one or more of the UEs 115 (e.g., application clients). The network node may communicate the data with the subset of UEs 115 based on the second time indicated via the signal. For example, a second quantity of bits of the data for the subset of UEs 115 at the second time may be greater than a third quantity of bits of the data for the subset of UEs 115 at a third time. That is, the second time may be associated with a peak in the data for the subset of UEs 115 that is offset from the first time at which there is a peak in the data for one or more other UEs 115. The offset between peaks may support improved communication reliability and reduced latency for the UEs 115 and the applications supported by the UEs 115.

Figure 2:
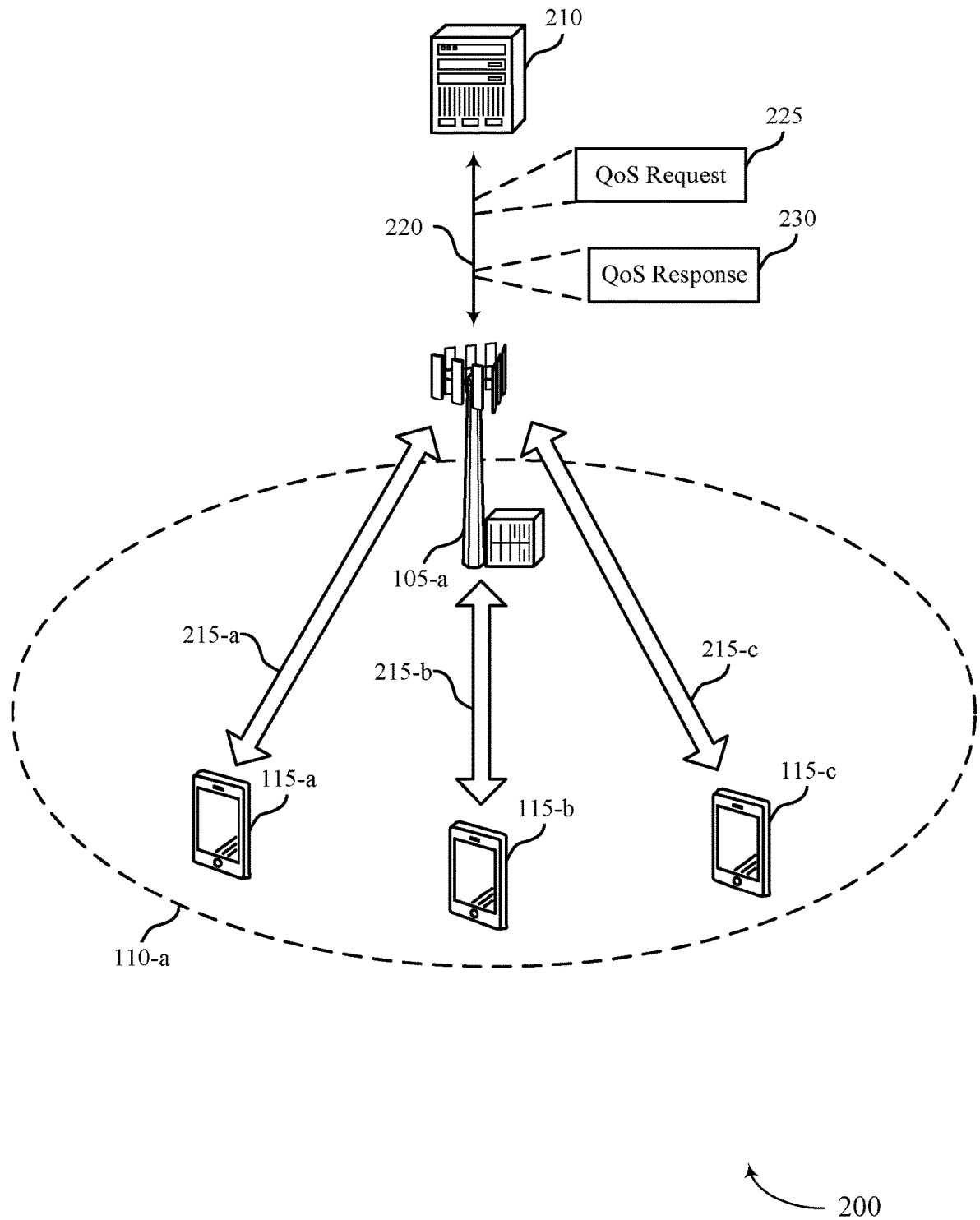
FIG. 2 illustrates an example of a wireless communications system that supports peak traffic position adjustment for wireless communication in accordance with aspects of the present disclosure.

FIG. 2 illustrates an example of a wireless communications system 200 that supports peak traffic position adjustment for wireless communication in accordance with aspects of the present disclosure. The wireless communications system 200 may implement or be implemented by aspects of the wireless communications system 100 as described with reference to FIG. 1. For example, the wireless communications system 200 may include a base station 105-a and UEs 115-a, 115-b, and 115-c, which may represent examples of a base station 105 and a UE 115 as described with reference to FIG. 1. The base station 105-a may communicate with each of the UEs 115 within a geographic coverage area 110-a and via a respective communication link 215 (e.g., communication links 215-a, 215-b, and 215-c). The base station 105-a may communicate with an edge server 210 via a backhaul link 220. The edge server 210 may represent an example of a network node or a logical entity of the network, such as an edge cloud, an AF, or some other network entity. In some examples, the base station 105-a may be referred to as a network node.

The UEs 115 may, in some examples, support one or more applications (e.g., cloud gaming applications, XR applications, virtual reality (VR) split rendering applications, augmented reality (AR) split computation applications, some other applications, or any combination thereof) that may be associated with relatively frequent uplink data traffic, downlink data traffic, or both. The data traffic for the one or more applications may be associated with relatively frequent changes (e.g., low latency). In some examples, each UE 115 may share computational or rendering processes with the edge server 210 (e.g., an edge cloud), which may result in frequent uplink and downlink transmissions with relatively small data packet sizes. In some examples, one or more of the UEs 115 may be a wearable device (e.g., an XR headset). Additionally or alternatively, one or more of the UEs 115 may represent an example of or be in communication with an application client or a client device (e.g., a gaming device or controller) via an API. In some examples, the application client may be software or a logical entity that is executed by the UE 115.

The uplink data traffic, the downlink data traffic, or both for such applications may include encoded video data (e.g., cloud gaming traffic). The video traffic may be periodic or quasi-periodic based on a frame rate of the data. For example, the UE 115-a may receive periodic or quasi-periodic bursts of data traffic every frame (e.g., at one frame-per-second (1/fps), or two possibly staggered per frame at $1/(2*\text{fps})$). For example, the data traffic may occur every X seconds, where X may be $\frac{1}{30}$ seconds, $\frac{1}{60}$ seconds, or some other duration depending on a quantity of configured frames per second. A burst of data traffic may be referred to as a peak in data traffic and may correspond to a time at which a quantity of bits of data transmitted to or from one or more UEs 115 exceeds a threshold quantity of bits. Additionally or alternatively, the data bursts or peaks may correspond to times at which a quantity of bits of data transfer for one or more UEs 115 is greater than a quantity of bits of data transfer for the one or more UEs 115 at other times.

The frames for the uplink and downlink data traffic may be intra-coded (I) frames or predicted (P) frames. In some examples, the data traffic may be transmitted according to a group of pictures method, where some of the frames may be I-frames and some of the frames may be P-frames. The I-frames may be larger than the P-frames (e.g., a size ratio of three to one, or some other ratio). For example, the I-frames may include more bits or pixels than the P-frames. The data traffic may be transmitted using I-frames and P-frames in a periodic manner, or the transitions between I-frames and P-frames may be aperiodic. If the I-frames are transmitted in a periodic manner, the peaks in data traffic may be periodic based on the I-frames. Alternatively, if the I-frames are transmitted aperiodically or quasi-periodically, the peaks in the data traffic may be aperiodic or quasi-periodic.

The edge server 210 may be in communication with a core network directly or via one or more other layers or logical entities. The core network may represent an example of a core network 130 described with reference to FIG. 1. The core network may establish one or more QoS flows for communicating data between each UE 115 and the network. Each QoS flow may be configured with or correspond to an MDBV, which may indicate a quantity of bits that the QoS flow may support at a time. The network may configure one or more QoS parameters for each QoS flow. The edge server 210 may forward a QoS request 225 to the base station 105-a. The QoS request 225 may establish each QoS flow and indicate the QoS parameters for communications with one or more UEs 115 via the respective QoS flow. In some examples, the base station 105-a may forward the QoS request 225 to one or more of the UEs 115-a, 115-b, and 115-c to indicate the QoS parameters. The QoS parameters may include a PDB, a PER, one or more other QoS parameters, or any combination thereof.

The network may support communications with each UE 115 in accordance with or based on the QoS parameters for each QoS flow. For example, the network may ensure that a delay and an error rate of data traffic within each QoS flow do not exceed the PDB and PER for the QoS flow to improve communication reliability and support latency requirements for each application. The network may meet the QoS parameters (e.g., the PDB and PER at average bit-rates) for data traffic peaks that are the same as or less than the MDBV. The data traffic may exceed the MDBV if peaks for multiple UEs 115 overlap or collide in time. For example, if the network serves multiple UEs 115 at a time, and the peaks in data traffic for the UEs 115 overlap in time, a total quantity of bits of the traffic may exceed the MDBV. If a quantity of bits of data traffic transmitted via a QoS flow at a time exceeds the MDBV, the network may not support the QoS parameters. That is, the network may not be able to ensure that the QoS parameters are satisfied for each client if the data traffic exceeds the MDBV (e.g., a threshold value).

Techniques described herein provide for the network to adjust a time at which a peak in data traffic occurs for one or more UEs 115 based on a threshold for an overall peak in data traffic for the one or more UEs 115. By adjusting the peak timing, the network may reduce a maximum quantity of bits of data transfer for multiple UEs 115 at a time and support communications with more UEs 115 while satisfying QoS parameters for each of the UEs 115 than if the network does not adjust the timing of the peaks. A network node, such as the base station 105-a, or some other network node in communication with the edge server 210, may identify a first time at which the data traffic for the UEs 115 exceeds a threshold value (e.g., a first peak data location) by monitoring the data traffic or by receiving an indication of the first time via the QoS request 225. Additionally or alternatively, an application client or a UE 115 may determine the first time associated with the first peak in the data based on monitoring data traffic or receiving an indication of the first time from an application server in communication with the application client. In this case, the application client or the UE 115 may transmit an indication of the first time to the network node via an API (e.g., using a UE 115 as a relay device). Techniques for determining or identifying the peak data locations for each UE 115 are described in further detail with reference to FIGS. 3-7.

The base station 105-a may determine, in response to identifying that a quantity of bits of the data traffic for one or more users exceeds the threshold quantity at the first time, a second time that is associated with a second location of the peak in data traffic and that corresponds to a second quantity of bits of the data traffic for a subset of the multiple UEs 115. The second time may correspond to a peak data location for the subset of UEs 115 that is offset from the first time (e.g., an adjusted peak data location). The base station 105-a may transmit the QoS response message 230 to the edge server 210 to indicate the second time for the subset of UEs 115, and the edge server 210 may forward the QoS response message 230 to a data network, as described with reference to FIG. 6A. Additionally or alternatively, the base station 105-a may transmit the QoS response message 230 directly to the data network, as described with reference to FIG. 6B. In some examples, the QoS response message 230 may be referred to as a signal herein. In some examples, the base station 105-a (e.g., a network node) may transmit the indication of the offset between the first time and the second time to a UE 115, and the UE 115 may forward the indication to an application client via an API, as described with reference to FIG. 7.

The data network may generate and transmit downlink data traffic to the subset of UEs 115 based on the indication of the second time. For example, a quantity of bits of the data traffic for the subset of UEs 115 at the second time may be greater than a quantity of bits of the data traffic for the subset of UEs 115 at other times. That is, the second time may correspond to an adjusted peak in the data traffic for the subset of UEs 115 that is offset from the peak in data traffic for other UEs 115 in communication with the network. A total quantity of bits of data communicated by the network at a given time may thereby be the same as or less than an MDBV value, such that the network may support efficient and reliable communications and support QoS parameters for each user.

In some examples, an application client may identify a location of the peaks in uplink data traffic for each user and indicate the peak location information to the base station 105-a. In such cases, the base station 105-a may determine a second time at which one or more peaks occur for a subset of users and transmit an indication of the second time to the application client via an API. In some examples, the base station 105-a may transmit the indication of the second time to a UE 115 and the UE 115 may relay the indication to the application client. The application client and the base station 105-a may communicate uplink data in accordance with the indicated second time. Such uplink data traffic adjustments are described in further detail with reference to FIG. 7.

Figure 3A:
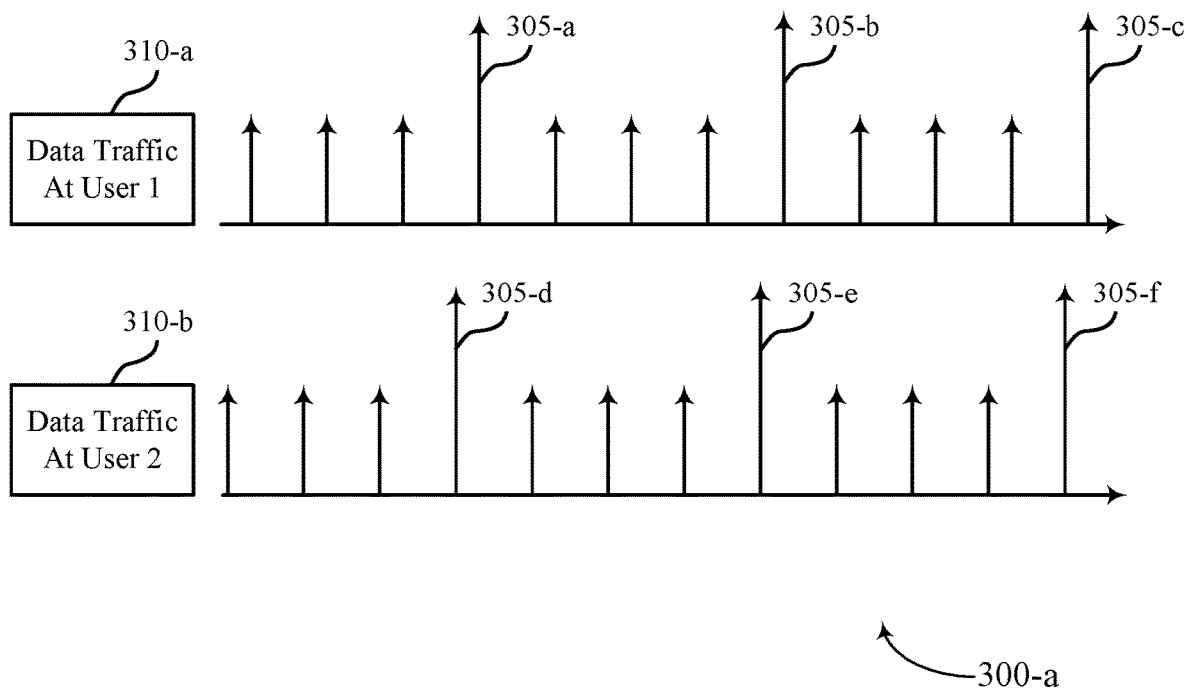
FIGS. 3A and 3B illustrate examples of communications timelines that support peak traffic position adjustment for wireless communication in accordance with aspects of the present disclosure.
Figure 3B:
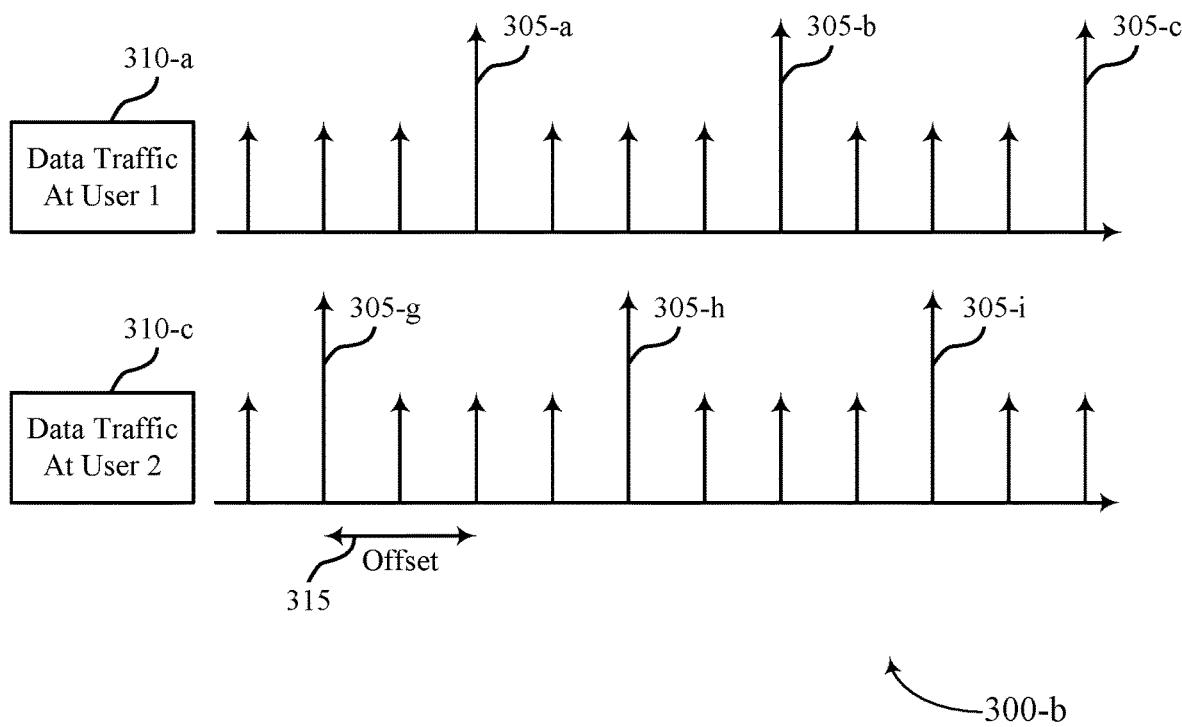

FIGS. 3A and 3B illustrate examples of communications timelines 300 that support peak traffic position adjustment for wireless communication in accordance with aspects of the present disclosure. The communications timelines 300-a and 300-b may implement or be implemented by aspects of the wireless communications systems 100 and 200 described with reference to FIGS. 1 and 2. For example, the communications timelines 300 may illustrate timing for data traffic 310 communicated by a user, which may be an example of a UE 115 or an application client as described with reference to FIGS. 1 and 2. The data traffic 310 may be uplink data traffic or downlink data traffic transmitted to or received from a data network (e.g., via a base station 105 or another network node).

The data traffic 310 may include one or more peaks 305 (e.g., bursts) of data, and each peak 305 may correspond to a time at which a quantity of bits of the data traffic 310 is greater than a threshold quantity or greater than quantities of bits of the data traffic 310 at other times (e.g., a maximum quantity of bits of the data traffic 310). For example, the users may transmit or receive fewer bits of data during the time periods between the peaks 305 than at the times at which the peaks 305 occur. The peaks 305 may represent a time instance at which a quantity of bits of data is relatively large or a time period (e.g., a peak window), where a quantity of bits of data received within the peak window is relatively large. The peaks 305 may occur periodically in the example of FIGS. 3A and 3B. However, it is to be understood that in some examples, the peaks 305 may occur quasi-periodically or aperiodically for one or more users, as described with reference to FIG. 2.

FIG. 3A illustrates a first communications timeline 300-a for communications at a first user and a second user. The communications timeline 300-a illustrates a timeline for receiving or transmitting data traffic 310-a at a first user (e.g., User 1) and data traffic 310-b at a second user (e.g., User 2). The first and second users may represent examples of UEs 115, application clients, or some other wireless devices in communication with the network.

The first user may be scheduled to transmit or receive the data traffic 310-a, which may be associated with three or more peaks 305, such as the peaks 305-a, 305-b, and 305-c. The second user may be scheduled to transmit or receive the data traffic 310-b, which may be associated with three or more peaks 305, such as the peaks 305-d, 305-e, and 305-f. The peaks 305 for each user occur periodically in the example of FIG. 3A. However, it is to be understood that in some examples, the peaks 305 may occur quasi-periodically or aperiodically for one or more users, as described with reference to FIG. 2. Each peak 305 may correspond to a time at which the respective user is scheduled to transmit or receive a quantity of bits of the data traffic 310 that is greater than a second quantity of bits of the data traffic 310 that is transmitted or received at one or more second times. For example, the users may transmit or receive fewer bits of data during the time periods between the peaks 305 than during the times at which the peaks 305 occur.

The network may allocate a quantity of time domain resources for each user to serve the data traffic 310. A quantity of time domain resources allocated at the time of a peak 305 (e.g., within a time period before and/or after the time of the peak 305) may be greater than a quantity of time domain resources allocated for the data traffic 310 at other times (e.g., for fewer quantities of bits of the data traffic 310). For example, a relatively large quantity of time domain resources may be allocated within a time period to serve the data traffic 310-a for the peak 305-a. The time period may begin at the peak 305-a, before the peak 305-a, or after the peak 305-a.

In the example of FIG. 3A, the peaks 305 for the first user may occur within a threshold time of the peaks 305 for the second user. Although not illustrated in FIG. 3, it is to be understood that, in some examples, the peaks 305 for two or more users may occur at the same time. Peaks 305 for two or more users that occur at the same time or within a threshold time period may overlap or collide. For example, the peaks 305-a, 305-b, and 305-c of the data traffic 310-a for the first user may overlap or collide with the peaks 305-d, 305-e, and 305-f of the data traffic 310-b for the second user in time. Time domain resources that are allocated to serve the data traffic 310-a at each of the peaks 305-a, 305-b, and 305-c may overlap with time domain resources that are allocated to serve the data traffic 310-b at each of the peaks 305-d, 305-e, and 305-f, respectively. In such cases, supporting QoS parameters for the data traffic 310-a and the data traffic 310-b for both the first and second users may not be feasible due to the relatively large quantity of overlapping time domain resources and corresponding bits of data traffic 310.

A network node that supports communications with the first and second users may identify or determine a location of each of the peaks 305 in the data traffic 310-a and 310-b based on communicating the data traffic 310-a and 310-b with the first and second users, respectively, or based on signaling received from a logical entity, such as an edge server, as described in more detail with reference to FIGS. 4 through 6. Additionally or alternatively, the network node may determine the location or time of each of the peaks 305 in the data traffic 310-a and 310-b based on an indication received from an application client (e.g., if the data traffic is uplink data traffic), as described in further detail with reference to FIG. 7.

Techniques described herein provide for the network node to adjust a time at which one or more peaks 305 in the data traffic 310 occur for a subset of users to reduce a total quantity of bits of data traffic that are communicated at a time. For example, the network node may determine a second time that corresponds to a second peak 305 in the data traffic 310 for a subset of one or more users that is offset from a first time that corresponds to a first peak 305 in the data traffic 310 for one or more other users. In some examples, the second peak 305 may represent an example of an adjustment of the first peak 305. The network node may transmit a message to a data network that indicates the second time, the offset 315, the subset of users, or any combination thereof. The data network may adjust the data traffic 310 (e.g., downlink data) for the subset of users in accordance with the message. Alternatively, the network node may transmit an indication of the second time to the subset of users, and each user may transmit the data traffic 310 (e.g., uplink data) in accordance with the second time, or the user may forward the indication to an application server, which may adjust the timing of the data traffic 310.

FIG. 3B illustrates a second communications timeline 300-b for communications at a first user and a second user. The communications timeline 300-b illustrates a timeline for receiving or transmitting data traffic 310-a at the first user (e.g., User 1) and data traffic 310-c at the second user (e.g., User 2) after adjusting a timing of one or more peaks 305 for the data traffic 310-c. The first and second users may represent examples of UEs 115, application clients, or some other wireless devices in communication with the network.

The first user may be scheduled to transmit or receive the data traffic 310-a, which may represent an example of the data traffic 310-a described with reference to FIG. 3A. The second user may be scheduled to transmit or receive the data traffic 310-c, which may be associated with three or more peaks 305, such as the peaks 305-g, 305-h, and 305-i. The data traffic 310-c may represent an example of the data traffic 310-b described with reference to FIG. 3A after the network node adjusts a time at which the peaks 305 occur.

In some examples, a network node in communication with the first and second users may determine an initial time at which each peak 305 is scheduled based on communicating the data traffic 310-a and 310-b with the first and second users, respectively, as described with reference to FIG. 3A. For example, the network node may determine, after communicating the data traffic 310-a and 310-b, that one or more peaks 305 for each user overlap, and a total quantity of bits communicated at a time exceeds a threshold quantity. Additionally or alternatively, the network node may receive a message that indicates the location of the peaks 305. For example, the message may indicate a time at which the peaks 305 occur and a periodicity of the peaks 305.

As described with reference to FIG. 2 and FIG. 3A, the network node may adjust the timing of one or more peaks 305 for a subset of users based on determining that a total quantity of bits of data traffic 310 for multiple users exceeds a threshold quantity (e.g., an MDBV). In the example of FIG. 3B, the subset of users may include the second user. The network node may determine a second time for the peaks 305 of the data traffic 310-c that is offset from the first time at which the peaks 305 in the data traffic 310-a occur by an offset 315. The network node may determine to adjust the peak timing for the second user based on one or more communications parameters associated with the second user, as described in further detail with reference to FIGS. 4 and 5. The network node may determine a value of the offset 315 based on one or more communications parameters, such as a quantity of users in communication with the network, a periodicity of the peaks 305 for each user, one or more link conditions associated with each user, or any combination thereof.

The second time may correspond to a time at which one or more of the peaks 305-*g*, 305-*h*, and 305-*i* occur. Each of the peaks 305-*g*, 305-*h*, and 305-*i* may be associated with a quantity of bits of the data traffic 310-*c* that are less than a threshold value, such as an MDBV value. As such, the quantity of bits of the data traffic 310-*c* may satisfy QoS parameters for the second user. The network node may transmit a message to a data network to indicate the offset 315 (e.g., a peak location offset). The data network may generate the data traffic 310-*c* for the second user such that the peaks 305 of the data traffic 310-*c* are offset from the peaks 305 of the data traffic 310-*a* for the first user by the indicated offset 315. Alternatively, for uplink data, the network node may transmit an indication of the offset 315 to the second user, and the second user may transmit the data traffic 310-*c* in accordance with the offset 315, or the second user may forward the indication to an application server, and the application server may adjust a timing of the data traffic 310-*c* based on the offset 315.

Although not illustrated in FIGS. 3A and 3B, in some examples, the peaks 305 may not occur periodically. In such cases, the network node may determine an offset for each individual peak 305 or for a subset of peaks 305. By offsetting peaks 305 in data traffic 310 for a subset of users from peaks 305 in data traffic 310 for other users, the network node may reduce a total quantity of bits of data traffic and corresponding time domain resource allocations at a time, which may provide for the network to support QoS parameters for each user.

Figure 4:
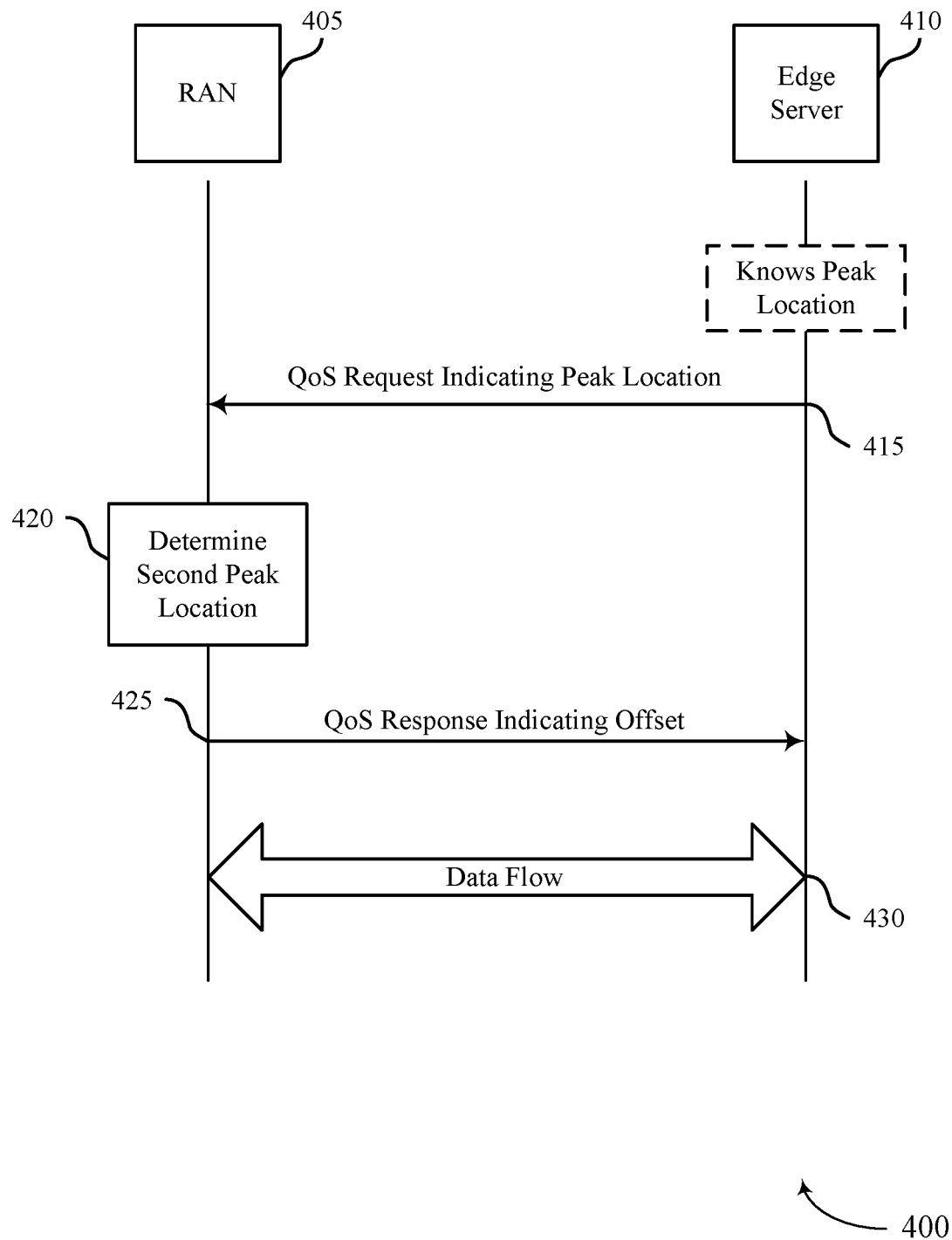
FIG. 4 illustrates an example of a process flow that supports peak traffic position adjustment for wireless communication in accordance with aspects of the present disclosure.

FIG. 4 illustrates an example of a process flow 400 that supports peak traffic position adjustment for wireless communication in accordance with aspects of the present disclosure. The process flow 400 may implement or be implemented by aspects of the wireless communications systems 100 and 200 as described with reference to FIGS. 1 and 2, respectively. For example, the process flow 400 may implement or be implemented by a RAN 405 and an edge server 410. The RAN 405 may represent an example of a network or a network node (e.g., a base station 105 or some other network node) as described with reference to FIGS. 1 through 3. For example, the RAN 405 may serve or support communications with a set of multiple users (e.g., clients or devices, such as UEs 115). The edge server 410 may represent an example of an edge server 210 as described with reference to FIG. 2. In this case, the edge server 410 may transmit a message to the RAN 405 to indicate a location or a time at which one or more peaks in data traffic occur.

In the following description of the process flow 400, the operations between the RAN 405 and the edge server 410 may be performed in different orders or at different times. Some operations may also be left out of the process flow 400, or other operations may be added. Although the RAN 405 and the edge server 410 are shown performing the operations of the process flow 400, some aspects of some operations may also be performed by one or more other wireless devices.

The edge server 410 (e.g., a logical entity) may, in some examples, be referred to or represent an example of an AF as described herein. The edge server 410 may be in communication with a data network, as described with reference to FIG. 2. As such, the edge server may identify (e.g., know, determine, or generate) peak locations for data traffic for multiple users. That is, the edge server 410 may identify one or more times at which a quantity of bits of the data traffic for the multiple users may exceed a threshold quantity. In some examples, the first time may correspond to peaks in data traffic for each of the multiple users, and a total quantity of bits for the multiple users may exceed the threshold value at the first time. The users may represent examples of UEs 115 as described with reference to FIGS. 1 through 3, or the users may represent examples of application clients or other devices.

At 415, the edge server 410 may transmit a QoS request to the RAN 405. The QoS request may represent an example of the QoS request 225 described with reference to FIG. 2. For example, the QoS request may be a message that establishes communications with multiple devices (e.g., via the RAN 405). The QoS request may indicate one or more QoS flows for communicating with the multiple users and a set of QOS parameters associated with the multiple users. The QoS parameters may include a PER, a PDB, one or more other QoS parameters or any combination thereof. The QoS request may additionally or alternatively indicate an MDBV for the communications with the multiple users.

In the example of FIG. 4, the QoS request may indicate one or more peak locations for each user. For example, the QoS request may indicate, for each user, a time at which a burst in data traffic occurs, where the burst may correspond to a quantity of bits of the data traffic that is greater than a threshold quantity or greater than other quantities of bits of the data traffic at other times (e.g., a peak in the data traffic). In some examples, the QoS request may indicate a first time that corresponds to one or more peaks in the data traffic for multiple users. A quantity of bits of the data traffic for the multiple users or devices at the first time may be greater than a threshold value (e.g., the MDBV) based on the peaks for multiple users overlapping or colliding in time. In this case, the first time may be associated with a first peak in the data traffic.

The QoS request may indicate, for each peak, a time at which the peak occurs, a quantity of bits of data associated with the peak, a periodicity associated with the peak, an arrival phase associated with the quantity of bits of data, or any combination thereof. In some examples, the time of a peak may correspond to a time that is common to the RAN 405 and the edge server 410. For example, the RAN 405 may operate according to a first clock configuration and the edge server 410 may operate according to a second clock configuration that is the same as the first clock configuration (e.g., a common clock). The QoS request may indicate an absolute value of a common time (e.g., T0). An arrival phase may be based on the common time (e.g., the arrival phase may be T0±n(1/peak-periodicity)). As such, the edge server 410 may determine a location of multiple peaks in the data traffic for the subset of users based on the indication of the time at which a first peak occurs and a periodicity of the peaks. If the peaks do not occur periodically, the RAN 405 may transmit multiple indications via the QoS response message, or multiple QoS response messages to indicate adjusted times for each peak.

At 420, the RAN 405 may determine a second peak location for a subset of users. That is, the RAN 405 may determine a second time associated with the first peak in the data traffic that corresponds to a second quantity of bits of the data for the subset of devices (e.g., a peak location), where the second quantity of bits may satisfy QoS parameters for the subset of devices. For example, the second quantity of bits may be less than the MDBV, such that the RAN 405 may ensure the QoS parameters are satisfied for each user. The second time may be offset from the first time.

The RAN 405 may determine which devices or users to include in the subset of devices randomly or based on communication parameters associated with the subset of devices. The RAN 405 may adjust a timing of the data traffic to the second time for the identified or selected subset of users. For example, the RAN 405 may randomly select a quantity of users, where the quantity may be random or a configured percentage of the multiple users in communication with the RAN 405. Additionally or alternatively, the RAN 405 may include each user in the subset, or the RAN 405 may include each user that is scheduled with a peak in data traffic at the same time in the subset.

In some examples, the RAN 405 may determine to adjust the timing of data traffic for the subset of users based on the subset of users having or reporting a link condition that is less than a threshold link condition value. That is, users with a link condition worse than the threshold may be candidates for adjustment (e.g., optimization) of data traffic timing. Users with relatively low link conditions may occupy more resources than users with higher link conditions. As such, peaks in the data traffic for such users may be associated with relatively high resource utilization, which may increase a total resource utilization for all of the users in communication with the RAN 405. In such cases, the RAN 405 may adjust a timing of the data traffic for the subset of users associated with link conditions less than a threshold, and the RAN 405 may refrain from adjusting a timing of the data traffic for other users. By adjusting a timing of the data traffic for the subset of users associated with relatively poor link conditions, the RAN 405 may support more efficient resource utilization and improved reliability.

The RAN 405 may determine a value or magnitude of the offset between the first time and the second time based on one or more communication parameters associated with the subset of devices. The communication parameters may include a quantity of users supported by the RAN 405 (e.g., in the system), a periodicity of the peaks in data traffic for the users, link conditions associated with each user, or any combination thereof. The offset value may, in some examples, be calculated as a function of the one or more communication parameters to optimize communications and a flow of the data traffic for the multiple users.

At 425, the RAN 405 may transmit a QoS response message (e.g., a signal) that indicates the second time to the edge server 410. The QoS response message may represent an example of the QoS response message 230 described with reference to FIG. 2. For example, the QoS response message may indicate a value of the offset between the first time and the second time (e.g., an offset to peak value). In the example of FIG. 4, if the RAN 405 and the edge server 410 share a clock configuration, the offset value may indicate a common offset time. Additionally or alternatively, the offset value may be relative to arrival at a network node (e.g., a UPF). That is, the time offset from the first time at which the peak locations occur for multiple users determined by the RAN 405 may translate into a same offset value at one or more network nodes or logical entities.

The RAN 405 may transmit the QoS response message to the edge server 410 via an NEF, and the edge server 410 may forward the QoS response message to a data network, as described in further detail with reference to FIG. 6A. Additionally or alternatively, the RAN 405 may transmit the QoS response message directly to a data network via an interface between a UPF of the RAN 405 and the data network, as described in further detail with reference to FIG. 6B. The data network may adjust data traffic for the subset of users indicated via the QoS response message based on the indicated second time. For example, the data network may adjust the data traffic such that a peak in the data traffic for the subset of users occurs at the second time that is offset from the first time at which a peak in the data traffic occurs for other users in the system.

At 430, the RAN 405 and the edge server 410 may communicate the data flow based on the QoS response message. For example, the edge server 410 may forward the data traffic via one or more QoS flows from the data network to the RAN 405. The RAN 405 may transmit the data traffic to the multiple users. A quantity of bits of the data traffic for the subset of users at the second time indicated via the QoS response message may be greater than a quantity of bits of the data traffic for the subset of users at other times based on the QoS response message and the second time of the peak in the data traffic. That is, a peak in the data traffic for the subset of users may occur at the second time. A peak in data traffic for other users supported by the RAN 405 may occur at the first time, or some other time that is different than the second time. A total quantity of bits of data traffic communicated by the RAN 405 at a time may be less than a threshold quantity (e.g., the MDBV) based on the RAN 405 adjusting the timing. As such, the RAN 405 may support QoS parameters for each user.

Figure 5:
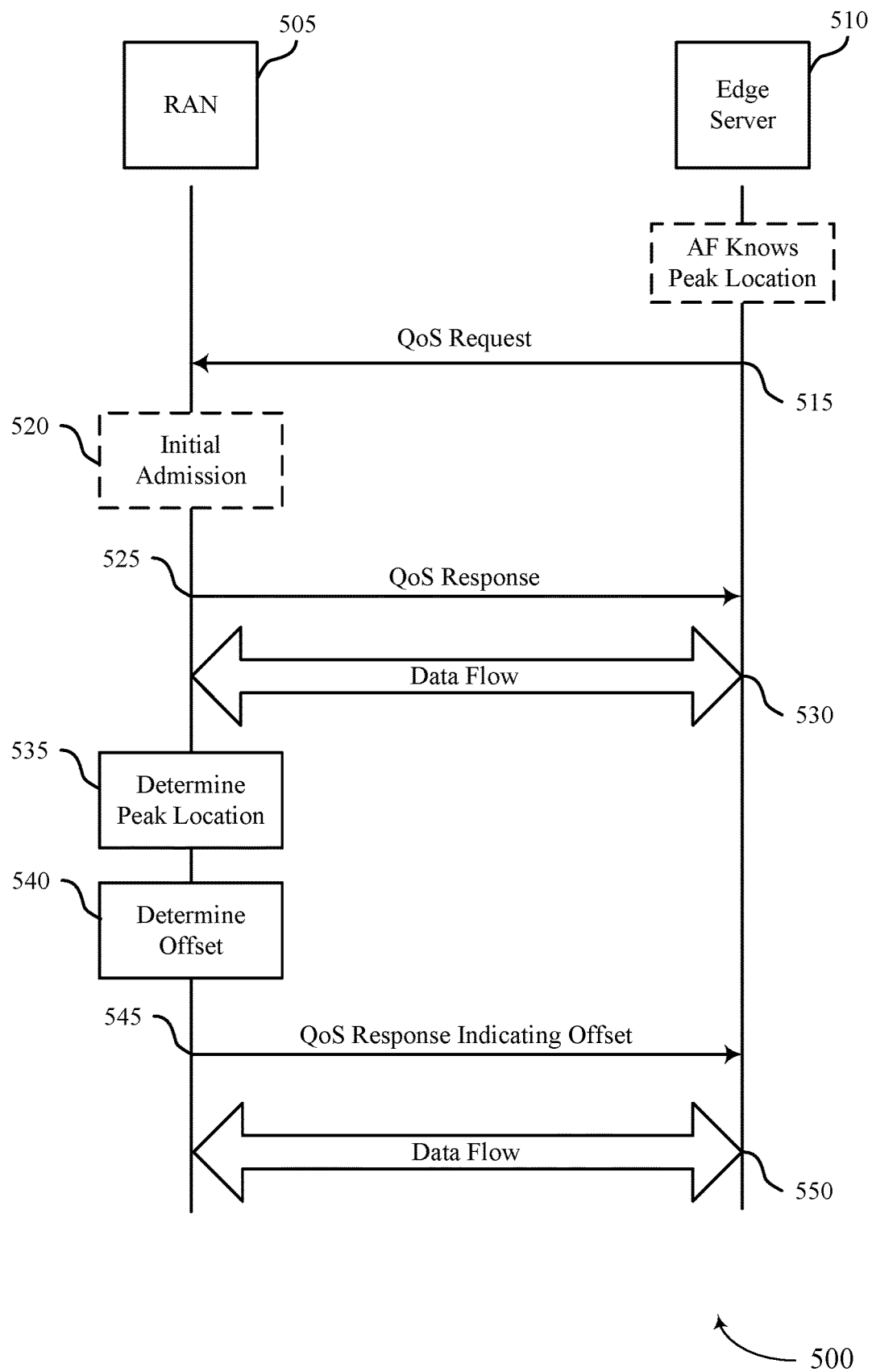
FIG. 5 illustrates an example of a process flow that supports peak traffic position adjustment for wireless communication in accordance with aspects of the present disclosure.

FIG. 5 illustrates an example of a process flow 500 that supports peak traffic position adjustment for wireless communication in accordance with aspects of the present disclosure. The process flow 500 may implement or be implemented by aspects of the wireless communications systems 100 and 200 as described with reference to FIGS. 1 and 2, respectively. For example, the process flow 500 may implement or be implemented by a RAN 505 and an edge server 510. The RAN 505 may represent an example of a network or a network node (e.g., a base station 105 or some other network node) as described with reference to FIGS. 1 through 4. The RAN 505 may serve and/or be in communication with a set of multiple users (e.g., clients or devices, such as UEs 115). The edge server 510 may represent an example of an edge server 210 as described with reference to FIG. 2 or an edge server 410 described with reference to FIG. 4.

In the following description of the process flow 500, the operations between the RAN 505 and the edge server 510 may be performed in different orders or at different times. Some operations may also be left out of the process flow 500, or other operations may be added. Although the RAN 505 and the edge server 510 are shown performing the operations of the process flow 500, some aspects of some operations may also be performed by one or more other wireless devices.

The edge server 510 (e.g., a logical entity) may, in some examples, be referred to or represent an example of an AF as described herein. The edge server 510 may be in communication with a data network, as described with reference to FIG. 2. As such, the edge server may identify (e.g., know, determine, or generate) peak locations for data traffic for multiple users. That is, the edge server may know one or more times at which a quantity of bits of the data traffic for the multiple users may exceed a threshold quantity. In some examples, the first time may correspond to peaks in data traffic for each of the multiple users, and a total quantity of bits for the multiple users may exceed the threshold value at the first time. The users may represent examples of UEs 115 as described with reference to FIGS. 1 through 4, or the users may represent examples of application clients or other devices.

At 515, the edge server 510 may transmit a QoS request to the RAN 505. The QoS request may represent an example of the QoS request 225 described with reference to FIG. 2. For example, the QoS request may be a message that establishes communications with multiple devices (e.g., via the RAN 505). The QoS request may indicate one or more QoS flows for communicating with the multiple users and a set of QoS parameters associated with the multiple users. The QoS parameters may include a PER, a PDB, one or more other QoS parameters or any combination thereof. The QoS request may additionally or alternatively indicate an MDBV for the communications with the multiple users.

At 520, the RAN 505 may process the QoS request and determine an initial admission. At 525, the RAN 505 may transmit a QoS response message to the edge server 510 in response to the QoS request. The QoS response message may initiate communications according to the QoS parameters indicated via the QoS request. At 530, the edge server 510 and the RAN 505 may communicate data traffic in accordance with the set of QoS parameters indicated by the QoS request. For example, the edge server 510 may forward data traffic to the RAN 505, and the RAN 505 may communicate the data traffic with one or more users.

At 535, the RAN 505 may estimate or infer a location of one or more peaks in the data traffic. For example, the RAN 505 may identify, based on communicating the data at 530, a first time at which a quantity of bits of the data traffic exceeds a threshold quantity (e.g., the MDBV). The first time may correspond to a peak in the data traffic for multiple users. The RAN 505 may not be able to support the QoS parameters for each of the users based on the quantity of bits exceeding the threshold value at the first time.

At 540, the RAN 505 may determine a second peak location for a subset of users. That is, the RAN 505 may determine a second time associated with the peak in the data traffic that corresponds to a second quantity of bits of the data for the subset of devices (e.g., a peak location), where the second quantity of bits may satisfy QoS parameters for the subset of devices. For example, the second quantity of bits may be less than the MDBV, such that the RAN 505 may ensure the QoS parameters are satisfied for each user. The second time may be offset from the first time.

The RAN 505 may determine which devices or users to include in the subset of devices randomly or based on communication parameters associated with the subset of devices. The RAN 505 may adjust a timing of the data traffic to the second time for the identified or selected subset of users. For example, the RAN 505 may randomly select a quantity of users, where the quantity may be random or a configured percentage of the multiple users in communication with the RAN 505. Additionally or alternatively, the RAN 505 may include each user in the subset, or the RAN 505 may include each user that is scheduled with a peak in data traffic at the same time in the subset. In some examples, the RAN 505 may determine to adjust the timing of data traffic for the subset of users based on the subset of users having or reporting a link condition that is less than a threshold link condition value, as described with reference to FIG. 4.

The RAN 505 may determine a value or magnitude of the offset between the first time and the second time based on one or more communication parameters. The communication parameters may include a quantity of users supported by the RAN 505 (e.g., in the system), a periodicity of the peaks in data traffic for the users, link conditions associated with each user, or any combination thereof. The offset value may, in some examples, be calculated as a function of the one or more communication parameters to optimize communications and a flow of the data traffic for the multiple users.

At 545, the RAN 505 may transmit a second QoS response message (e.g., a signal) to the edge server 510 to indicate a value of the offset between the first time and the second time (e.g., an offset to peak value). In the example of FIG. 5, if the RAN 505 and the edge server 510 share a clock configuration, the offset value may indicate a common offset time. Additionally or alternatively, if the RAN 505 operates according to a first clock and the edge server 510 operates according to a second clock that is different than the first clock, the offset value may be relative to arrival at a network node (e.g., a UPF). That is, the offset from the first time at which the peak locations occur for multiple users determined by the RAN 505 may translate into a same offset value at one or more network nodes or logical entities, including the edge server 510.

In some examples, a first speed of the first clock for the RAN 505 may be different than a second speed of the second clock for the edge server 510. That is, the clocks may tick at different rates. In some examples, the offset between clock rates may be referred to as drift. In such cases, a timing of the peaks for the subset of users may drift over time. As such, the RAN 505 may transmit a set of multiple QoS response messages periodically (e.g., during communications) to indicate an updated offset value. Each QoS response message may indicate an offset from a respective first time associated with peaks in the data traffic for a respective subset of devices. Each QoS response message may indicate a respective offset for the same subset of devices or a different subset of devices. The periodic indications of the offset values may provide for improved alignment between the RAN 505 and the edge server 510.

The RAN 505 may transmit the QoS response message to the edge server 510 via an NEF, and the edge server 510 may forward the QoS response message to a data network, as described in further detail with reference to FIG. 6A. Additionally or alternatively, the RAN 505 may transmit the QoS response message directly to a data network via an interface between a UPF of the RAN 505 and the data network, as described in further detail with reference to FIG. 6B. The data network may adjust data traffic for the subset of users indicated via the QoS response message based on the indicated second time. For example, the data network may adjust the data traffic such that a peak in the data traffic for the subset of users occurs at the second time that is offset from the first time at which a peak in the data traffic occurs for other users in the system. In the example of FIG. 5, the data network may adjust the timing after admission at 520 and transmission of a portion of the data traffic. The QoS parameters may not be met for each user for the portion of the data traffic, and the QoS parameters may be met for each user after the RAN 505 transmits the second QoS response that indicates the offset.

At 550, the RAN 505 and the edge server 510 may communicate the data flow based on the QoS response message and the second time associated with the peak. For example, the edge server 510 may forward the data traffic via one or more QoS flows from the data network to the RAN 505. The RAN 505 may transmit the data traffic to the multiple users. A quantity of bits of the data traffic for the subset of users at the second time indicated via the QoS response message may be greater than a quantity of bits of the data traffic for the subset of users at other times based on the QoS response message. That is, a peak in the data traffic for the subset of users may occur at the second time. A peak in data traffic for other users supported by the RAN 505 may occur at the first time, or some other time that is different than the second time. A total quantity of bits of data traffic communicated by the RAN 505 at a time may be less than a threshold quantity (e.g., the MDBV) based on the RAN 505 adjusting the timing. As such, the RAN 505 may support QoS parameters for each user.

Figure 6A:
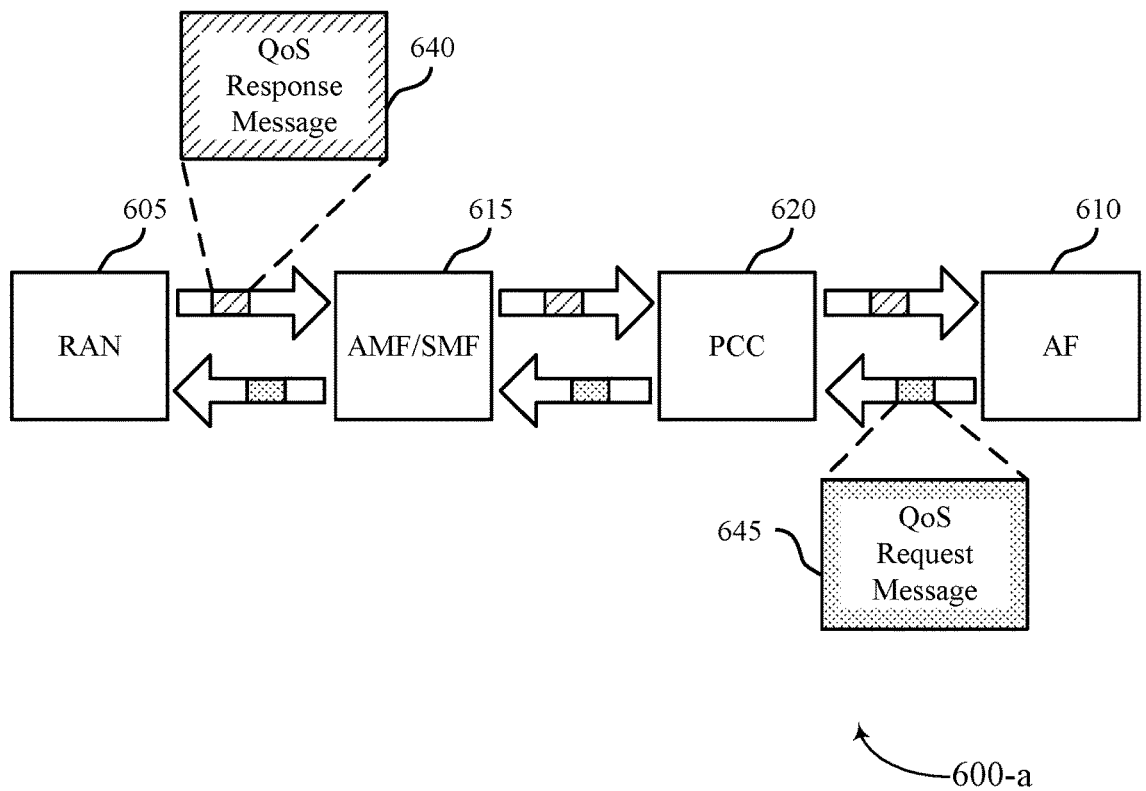
FIGS. 6A and 6B illustrate examples of signaling paths that support peak traffic position adjustment for wireless communication in accordance with aspects of the present disclosure.
Figure 6B:
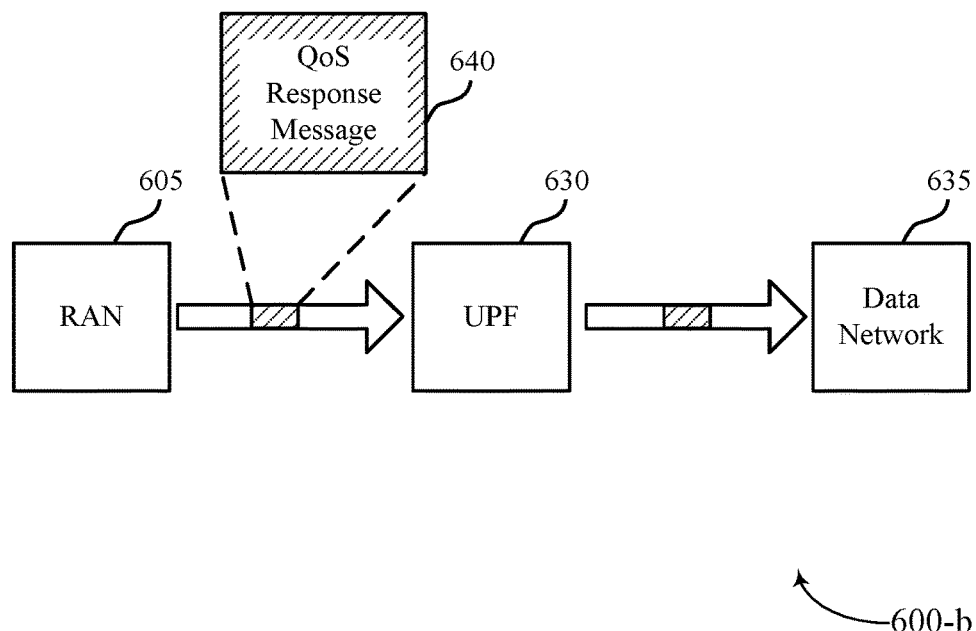

FIGS. 6A and 6B illustrate examples of signaling paths 600 that supports peak traffic position adjustment for wireless communication in accordance with aspects of the present disclosure. The signaling paths 600-a and 600-b may implement or be implemented by aspects of the wireless communications systems 100 and 200 as described with reference to FIGS. 1 and 2. For example, the signaling paths 600 may illustrate paths for a RAN 605 to receive a QoS request message 645 and transmit a QoS response message 640. The RAN 605 may represent an example of a network node as described with reference to FIGS. 1 through 5. The signaling paths 600 may include one or more other network nodes or logical entities, which may represent examples of corresponding logical entities as described with reference to FIGS. 1 through 5.

The QoS request message 645 may represent an example of a QoS request message described with reference to FIGS. 1 through 5. For example, the QoS request message 645 may establish communications with multiple users via the RAN 605. The QoS request message 645 may indicate one or more QoS flows, an MDBV, one or more QoS parameters for each user, or any combination thereof. In some examples, the QoS request message 645 may indicate one or more peak locations. The one or more peak locations may correspond to a time at which one or more peaks in data traffic occur for one or more users. The QoS request message 645 may indicate a common time associated with each peak location if the RAN 605 and the AF 610 share a common clock configuration, as described with reference to FIG. 4.

The QoS response message 640 may represent an example of a QoS response message described with reference to FIGS. 1 through 5. For example, the QoS response message 640 may be transmitted in response to the QoS request message 645 and may indicate an offset value. The offset value may correspond to an offset to peak parameter as described with reference to FIGS. 1 through 5. The QoS response message may indicate a time, an arrival phase, a periodicity, or any combination thereof of an adjusted peak in data traffic for a subset of users. The QoS response message may additionally indicate the subset of users. The RAN 605 may receive and transmit the QoS request message 645 and the QoS response message 640, respectively, via an interface. The interface may be an NEF interface, or some other interface.

FIG. 6A illustrates an example of a signaling path 600-a between the RAN 605 and the AF 610. The RAN 605 may represent an example of a network or a network node as described with reference to FIGS. 1 through 5. The AF 610 may represent an example of a logical network entity, such as an edge server, as described with reference to FIGS. 1 through 5.

In the example of FIG. 6A, the RAN 605 may receive a QoS request message 645 from the AF 610 via an NEF interface between the AF 610 and the RAN 605. The NEF may correspond to a signal path (e.g., a QoS notification path) between multiple logical entities, such as the AMF/SMF 615 and the policy and charging control (PCC) 620. The AMF/SMF 615 may include one or both of an AMF entity and an SMF entity. The AF 610 may transmit the QoS request message 645 (e.g., including the indication of the peak locations) to the PCC 620. The PCC 620 may transmit the QoS request message 645 to the AMF/SMF 615. The AMF/SMF 615 may transmit the QoS request message 645 to the RAN 605.

The RAN 605 may transmit the QoS response message 640 to the AF 610 via the NEF interface. For example, the RAN 605 may transmit the QoS response message 640 to the AMF/SMF 615. The AMF/SMF 615 may forward the QoS response message 640 to the PCC 620. The PCC 620 may forward the QoS response message 640 to the AF 610. In some examples, the AF 610 may forward the QoS response message 640, or an indication of the offset parameter conveyed via the QoS response message 640 to a data network 635. The data network 635 may adjust data traffic for a subset of users based on the QoS response message 640.

FIG. 6B illustrates an example of a signaling path 600-b between the RAN 605 and a data network 635. In the example of FIG. 6B, the RAN 605 may transmit the QoS response message 640 to the data network 635 via an interface between the RAN 605, the UPF 630 of the RAN 605, and the data network 635. That is, the RAN 605 may transmit an indication of an offset value directly to the data network 635 without relaying the indication via the AF 610. For example, the RAN 605 may transmit the QoS response message 640 to a UPF 630. The UPF 630 may forward the QoS response message 640 to the data network 635.

In some examples, the signaling path 600-b between the RAN 605 and the data network 635 may be referred to as a data path for the data network 635 to transmit data to the RAN 605. The data may be transmitted from the data network 635 to the UPF 630 to the RAN 605. In the example of FIG. 6B, the indication of an offset value may be transmitted (e.g., "piggy-backed") along the data path. By transmitting the indication of the offset value to the data network 635 via the data path, the RAN 605 may support more efficient signaling of the offset value with reduced overhead as compared with forwarding the signaling to the AF 610 via multiple logical entities.

Figure 7:
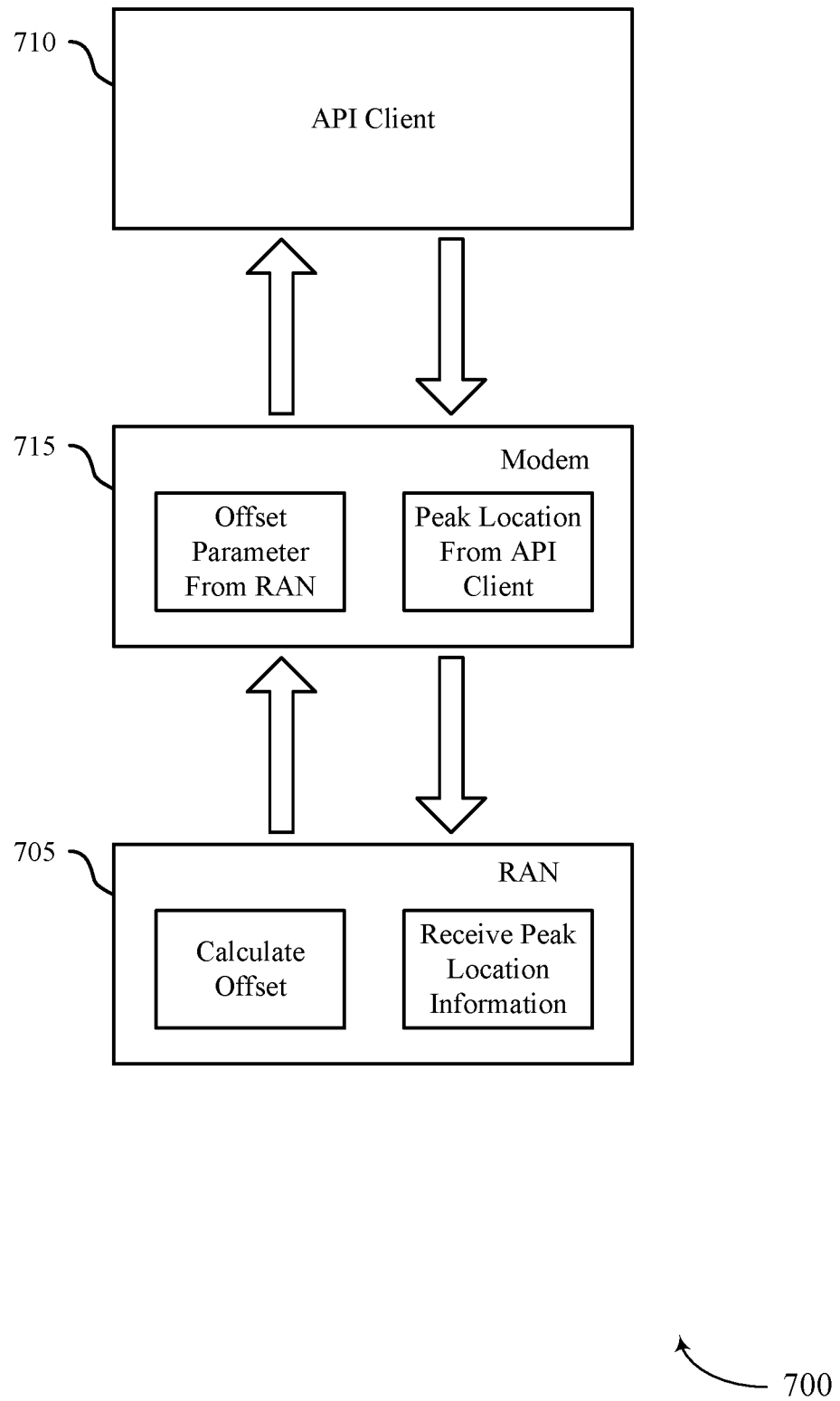
FIG. 7 illustrates an example of a flow diagram that supports peak traffic position adjustment for wireless communication in accordance with aspects of the present disclosure.

FIG. 7 illustrates an example of a flow diagram 700 that supports peak traffic position adjustment for wireless communication in accordance with aspects of the present disclosure. The flow diagram 700 may implement or be implemented by aspects of the wireless communications systems 100 and 200 as described with reference to FIGS. 1 and 2. For example, the flow diagram 700 illustrates signaling between an application client 710, a modem 715, and a RAN 705. The RAN 705 may represent an example of a RAN or other network node as described with reference to FIGS. 1 through 6. The modem 715 may represent an example of a UE 115 or some other wireless device, as described with reference to FIGS. 1 through 6. The application client 710 may represent an example of an application, a controller, or some other client that runs an application based on signaling received from the RAN 705. In some examples, the application client 710 may represent an application that is executed by the modem 715. The application client 710 may communicate with the modem 715 via an API. The modem 715 may relay communications between the application client and the RAN 705 via the API.

The application client may transmit uplink data traffic to the RAN 705 and receive downlink data traffic from the RAN 705. The uplink and downlink data traffic may, in some examples, be transmitted in periodic or quasi-periodic bursts of data (e.g., data traffic peaks), as described with reference to FIGS. 1 through 6. If a peak of the data traffic communicated by the application client 710 overlaps or collides with one or more other peaks of data traffic communicated by one or more other users of the RAN 705, a quantity of bits of the data that are transmitted at a time may exceed a threshold value (e.g., an MDBV), which may provide for increased latency and reduced reliability of the communications. For example, the users, the RAN 705, or both may not be able to meet one or more QoS parameters for the data traffic if a quantity of bits exceeds the threshold value.

In some examples, the application client 710 may identify a location of one or more initial peaks in data traffic communicated by the application client 710. For example, the application client may identify a first time at which a quantity of bits of the uplink data traffic exceeds a threshold quantity. The application client 710 may identify the first time based on communicating the data traffic with the RAN 705, based on a configuration of the uplink data at the application client 710, or based on an indication of the first time received from an application server. The application client 710 may transmit a message to the modem 715 that indicates the first time (e.g., a peak location), one or more other times associated with other peaks in the data traffic, or both. If the uplink data traffic is transmitted periodically, the application client 710 may indicate a first time and a periodicity associated with the first time.

The modem 715 (e.g., a UE 115) may identify the first time associated with the first peak in the data traffic that corresponds to a first quantity of bits for the application client 710 exceeding a threshold. The modem 715 may determine the first time based on the message received from the application client 710 (e.g., the application server) via the API, or based on communicating the data with the application client 710 via the API. The API may be an interface between the application client 710 and the RAN 705 that includes the modem 715. The modem 715 may transmit a first signal that indicates the first time for the application client 710 to the RAN 705. In some examples, the application client 710, the modem 715, the RAN 705, or any combination thereof may share a clock configuration. In such cases, the message may indicate a time that is common to each of the application client 710, the modem 715, and the RAN 705.

The RAN 705 may receive the indication of the first time, one or more other indications of times associated with relatively high quantities of bits of data for one or more other users, or both. The RAN 705 may determine a second time associated with an adjusted peak in data that corresponds to a quantity of bits of the data for a subset of one or more users. The quantity of bits of the data at the second time may satisfy one or more QoS parameters for the subset of users. The subset of users may include the application client 710. The second time may be offset from the first time associated with the peak in data traffic by an offset value. The RAN 705 may determine the subset of users, the offset value, or both based on one or more communication parameters associated with the subset of users, as described with reference to FIGS. 2 through 5.

The RAN 705 may transmit a second signal to the modem 715 that indicates the offset value. The second signal may thus indicate the second time associated with the peak in the data traffic for the application client. The modem 715 may forward the indication of the offset to the application client 710 via the API. The application client 710, the application server in communication with the application client 710, or both may adjust the data traffic based on the message and communicate the data with the modem 715 and the RAN 705 accordingly. For example, the application client 710 may transmit uplink data such that a quantity of bits as the second time that is offset from the first time by the indicated offset value is greater than a second quantity of bits of the uplink data traffic at other times. That is, the uplink data traffic may have a peak at the second time. Additionally or alternatively, the application client 710 may receive downlink data in accordance with the second time associated with the adjusted peak in the data traffic.

By offsetting the peak in the data traffic for the application client 710 (e.g., and one or more other application clients or other users), the RAN 705 may reduce a total quantity of data traffic at the RAN 705 to be less than a threshold quantity. Such techniques may provide for the RAN 705 to satisfy one or more QoS parameters for each user, which may improve communication reliability and reduce latency.

In some examples, the application client 710 may support downlink communications. In such cases, the application client 710 may determine a time at which one or more peaks in the downlink data traffic occur based on receiving the downlink traffic or based on an indication received by the application client. For example, the application client 710 may be in communication with an application server, and the application server may transmit a signal, such as a QoS request message, to the application client 710 to indicate the timing for the one or more peaks in the downlink data traffic. The signal and the indication of the peaks may represent examples of the QoS request message described with reference to FIG. 4.

The application client 710 may forward the indication of the peaks to the RAN 705, and the RAN 705 may determine an offset value for the application client 710, as described with reference to FIGS. 2 through 5. The RAN may transmit the indication of the offset value to the application client 710 via the modem 715. Additionally or alternatively, the application client 710 may determine the offset value based on one or more communication parameters. The application client may transmit a message, such as a QoS response message, to the application server to indicate the offset value. The application server may communicate downlink data with the application client in accordance with the indicated offset value. For example, a peak in the downlink data traffic may occur at the second time that is offset from the first time by the indicated offset value.

Figure 8:
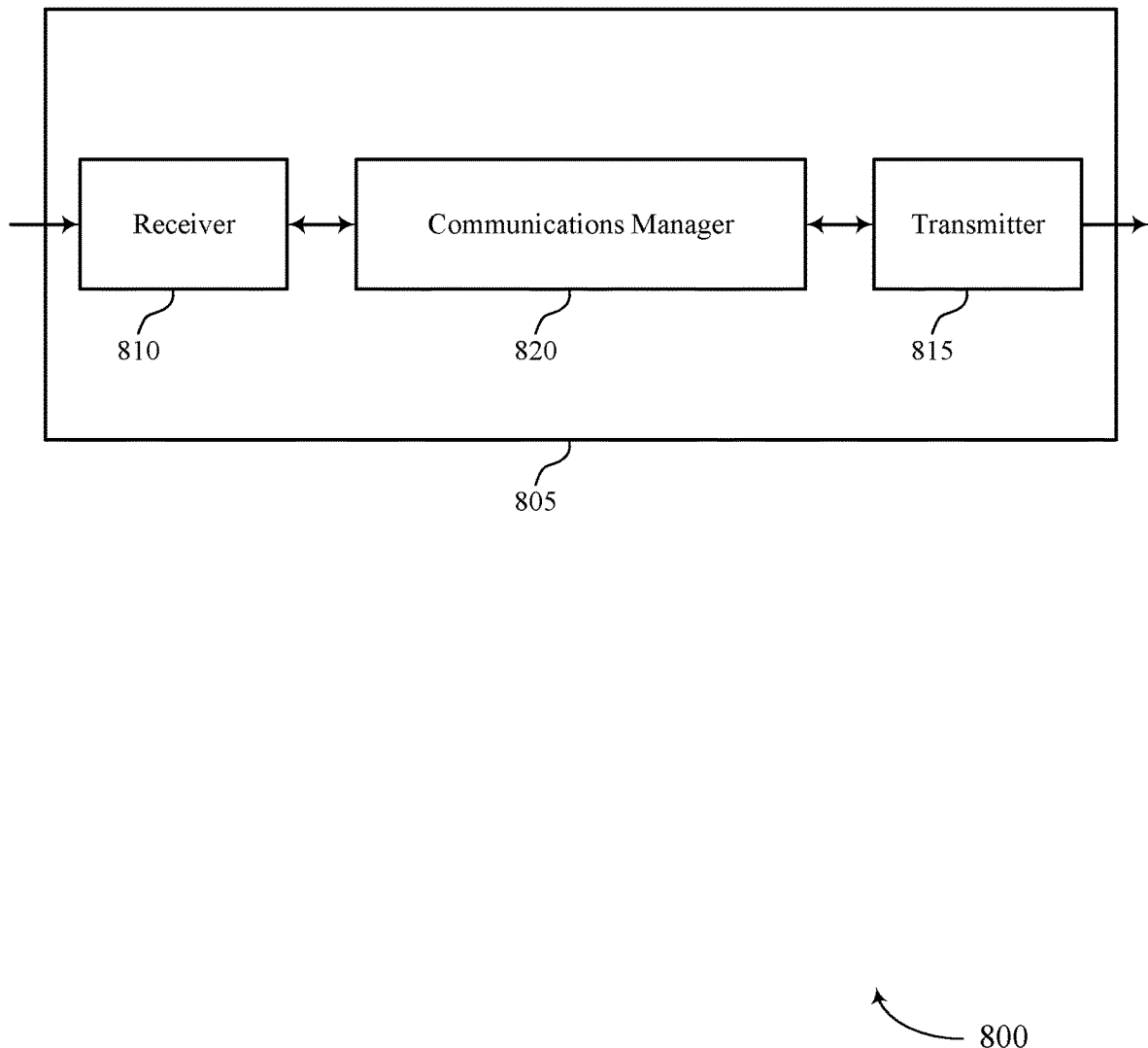
FIGS. 8 and 9 show block diagrams of devices that support peak traffic position adjustment for wireless communication in accordance with aspects of the present disclosure.

FIG. 8 shows a block diagram 800 of a device 805 that supports peak traffic position adjustment for wireless communication in accordance with aspects of the present disclosure. The device 805 may be an example of aspects of a Network Entity-ALPHA as described herein. The device 805 may include a receiver 810, a transmitter 815, and a communications manager 820. The device 805 may also include a processor. Each of these components may be in communication with one another (e.g., via one or more buses).

The receiver 810 may provide a means for receiving information such as packets, user data, control information, or any combination thereof associated with various information channels (e.g., control channels, data channels, information channels related to peak traffic position adjustment for wireless communication). Information may be passed on to other components of the device 805. The receiver 810 may utilize a single antenna or a set of multiple antennas.

The transmitter 815 may provide a means for transmitting signals generated by other components of the device 805. For example, the transmitter 815 may transmit information such as packets, user data, control information, or any combination thereof associated with various information channels (e.g., control channels, data channels, information channels related to peak traffic position adjustment for wireless communication). In some examples, the transmitter 815 may be co-located with a receiver 810 in a transceiver module. The transmitter 815 may utilize a single antenna or a set of multiple antennas.

The communications manager 820, the receiver 810, the transmitter 815, or various combinations thereof or various components thereof may be examples of means for performing various aspects of peak traffic position adjustment for wireless communication as described herein. For example, the communications manager 820, the receiver 810, the transmitter 815, or various combinations or components thereof may support a method for performing one or more of the functions described herein.

In some examples, the communications manager 820, the receiver 810, the transmitter 815, or various combinations or components thereof may be implemented in hardware (e.g., in communications management circuitry). The hardware may include a processor, a DSP, an ASIC, an FPGA or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 820, the receiver 810, the transmitter 815, or various combinations or components thereof may be implemented in code (e.g., as communications management software or firmware) executed by a processor. If implemented in code executed by a processor, the functions of the communications manager 820, the receiver 810, the transmitter 815, or various combinations or components thereof may be performed by a general-purpose processor, a DSP, a CPU, an ASIC, an FPGA, or any combination of these or other programmable logic devices (e.g., configured as or otherwise supporting a means for performing the functions described in the present disclosure).

In some examples, the communications manager 820 may be configured to perform various operations (e.g., receiving, monitoring, transmitting) using or otherwise in cooperation with the receiver 810, the transmitter 815, or both. For example, the communications manager 820 may receive information from the receiver 810, send information to the transmitter 815, or be integrated in combination with the receiver 810, the transmitter 815, or both to receive information, transmit information, or perform various other operations as described herein.

The communications manager 820 may support wireless communication at a network node in accordance with examples as disclosed herein. For example, the communications manager 820 may be configured as or otherwise support a means for determining a first time location for a peak in data traffic for a set of multiple devices in communication with a communications network including the network node. The communications manager 820 may be configured as or otherwise support a means for transmitting a signal that indicates a second time location for the peak in the data traffic for a subset of devices of the set of multiple devices based on a threshold for an overall peak in the data traffic for the set of multiple devices. The communications manager 820 may be configured as or otherwise support a means for communicating data including the data traffic with the subset of devices based on the signal indicating the second time location.

By including or configuring the communications manager 820 in accordance with examples as described herein, the device 805 (e.g., a processor controlling or otherwise coupled to the receiver 810, the transmitter 815, the communications manager 820, or a combination thereof) may support techniques for reduced processing, reduced overhead and more efficient utilization of communication resources. By adjusting a timing of a peak in data traffic for one or more users, the device 805 may reduce a total quantity of bits of data communicated at a time, which may support efficient utilization of communication resources and reduced processing and overhead by the processor of the device 805. The processor may support communication of the data in accordance with QoS parameters for each user, which may improve communication reliability.

Figure 9:
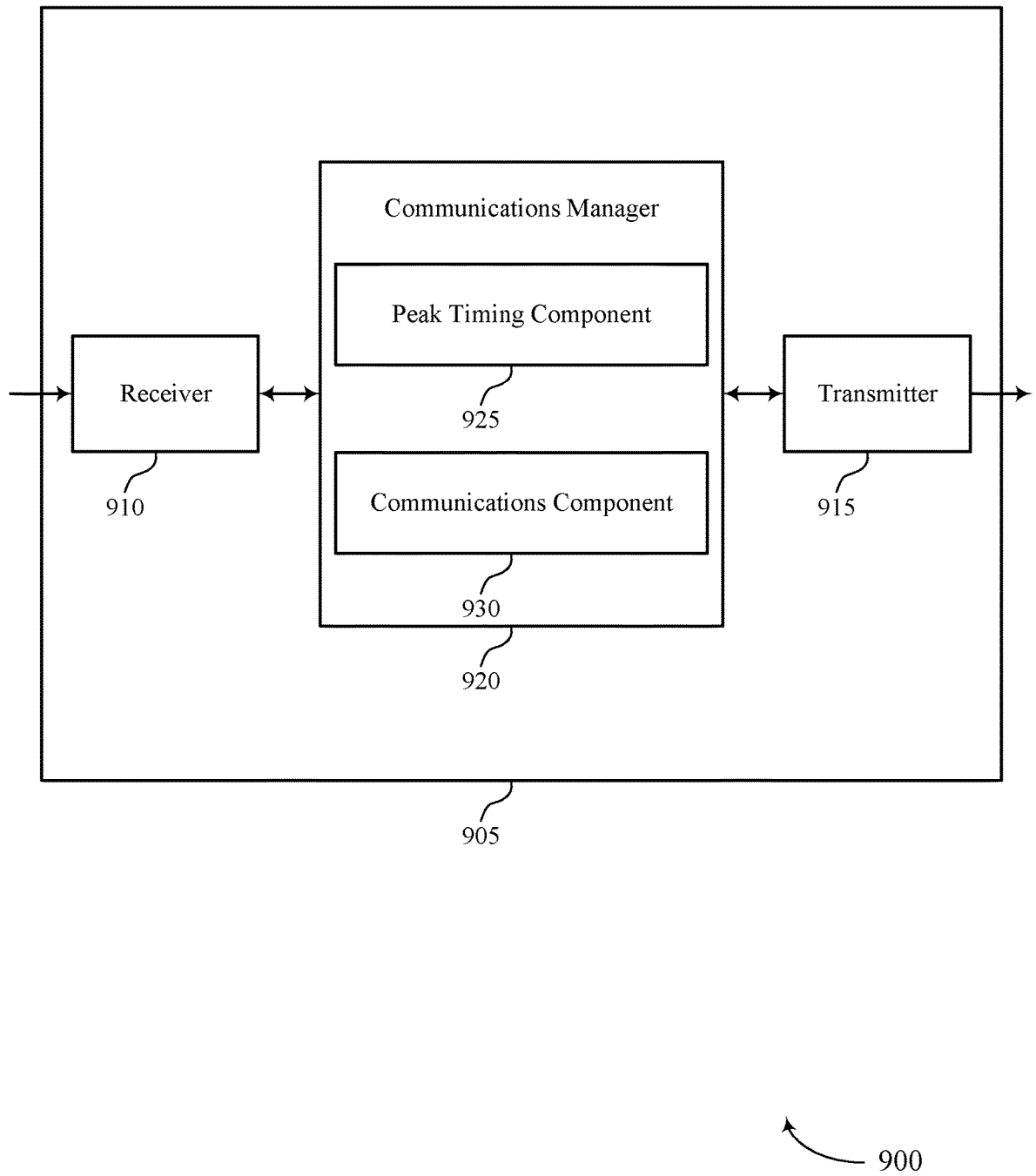

FIG. 9 shows a block diagram 900 of a device 905 that supports peak traffic position adjustment for wireless communication in accordance with aspects of the present disclosure. The device 905 may be an example of aspects of a device 805 or a Network Entity-ALPHA 115 as described herein. The device 905 may include a receiver 910, a transmitter 915, and a communications manager 920. The device 905 may also include a processor. Each of these components may be in communication with one another (e.g., via one or more buses).

The receiver 910 may provide a means for receiving information such as packets, user data, control information, or any combination thereof associated with various information channels (e.g., control channels, data channels, information channels related to peak traffic position adjustment for wireless communication). Information may be passed on to other components of the device 905. The receiver 910 may utilize a single antenna or a set of multiple antennas.

The transmitter 915 may provide a means for transmitting signals generated by other components of the device 905. For example, the transmitter 915 may transmit information such as packets, user data, control information, or any combination thereof associated with various information channels (e.g., control channels, data channels, information channels related to peak traffic position adjustment for wireless communication). In some examples, the transmitter 915 may be co-located with a receiver 910 in a transceiver module. The transmitter 915 may utilize a single antenna or a set of multiple antennas.

The device 905, or various components thereof, may be an example of means for performing various aspects of peak traffic position adjustment for wireless communication as described herein. For example, the communications manager 920 may include a peak timing component 925 a communications component 930, or any combination thereof. The communications manager 920 may be an example of aspects of a communications manager 820 as described herein. In some examples, the communications manager 920, or various components thereof, may be configured to perform various operations (e.g., receiving, monitoring, transmitting) using or otherwise in cooperation with the receiver 910, the transmitter 915, or both. For example, the communications manager 920 may receive information from the receiver 910, send information to the transmitter 915, or be integrated in combination with the receiver 910, the transmitter 915, or both to receive information, transmit information, or perform various other operations as described herein.

The communications manager 920 may support wireless communication at a network node in accordance with examples as disclosed herein. The peak timing component 925 may be configured as or otherwise support a means for determining a first time location for a peak in data traffic for a set of multiple devices in communication with a communications network including the network node. The peak timing component 925 may be configured as or otherwise support a means for transmitting a signal that indicates a second time location for the peak in the data traffic for a subset of devices of the set of multiple devices based on a threshold for an overall peak in the data traffic for the set of multiple devices. The communications component 930 may be configured as or otherwise support a means for communicating data including the data traffic with the subset of devices based on the signal indicating the second time location.

Figure 10:
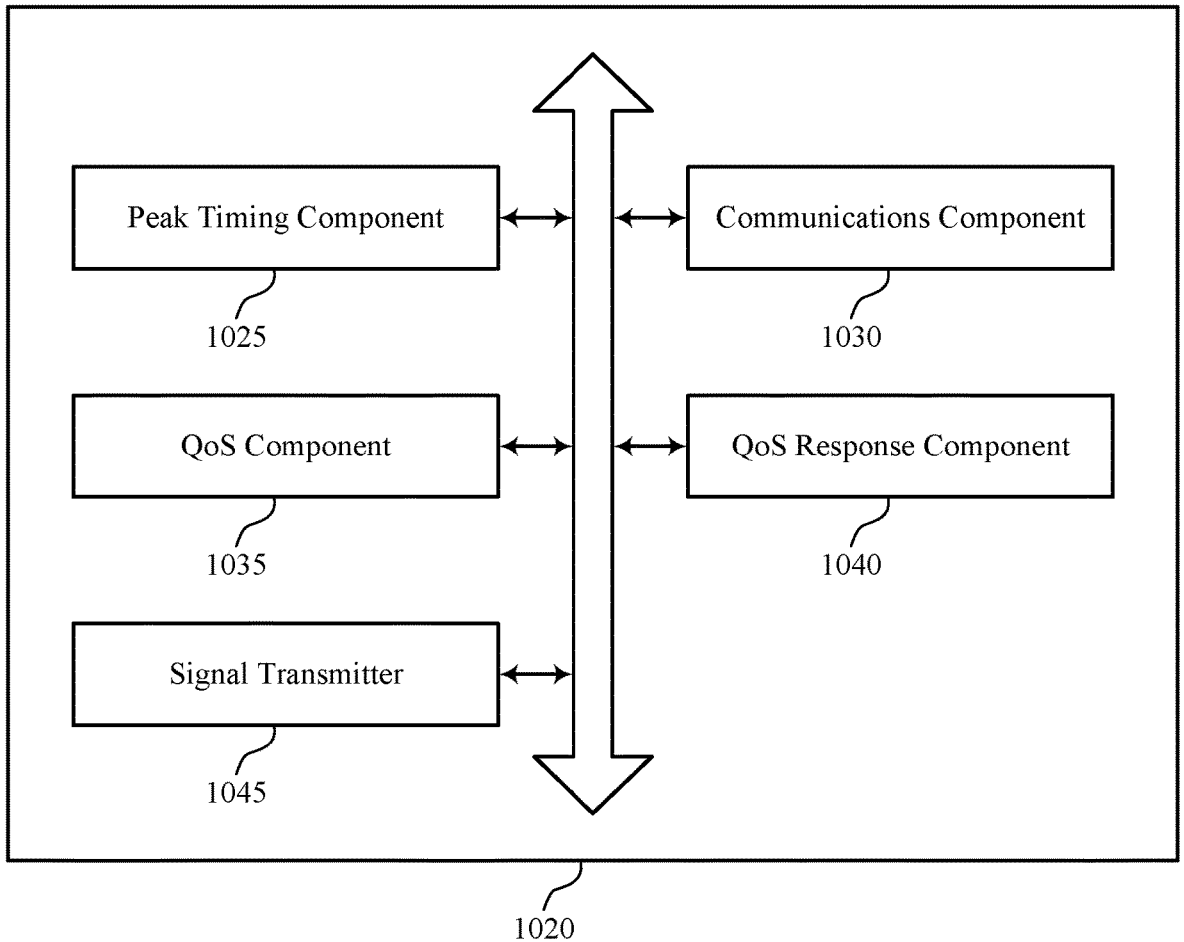
FIG. 10 shows a block diagram of a communications manager that supports peak traffic position adjustment for wireless communication in accordance with aspects of the present disclosure.

FIG. 10 shows a block diagram 1000 of a communications manager 1020 that supports peak traffic position adjustment for wireless communication in accordance with aspects of the present disclosure. The communications manager 1020 may be an example of aspects of a communications manager 820, a communications manager 920, or both, as described herein. The communications manager 1020, or various components thereof, may be an example of means for performing various aspects of peak traffic position adjustment for wireless communication as described herein. For example, the communications manager 1020 may include a peak timing component 1025, a communications component 1030, a QoS component 1035, a QoS response component 1040, a signal transmitter 1045, or any combination thereof. Each of these components may communicate, directly or indirectly, with one another (e.g., via one or more buses).

The communications manager 1020 may support wireless communication at a network node in accordance with examples as disclosed herein. The peak timing component 1025 may be configured as or otherwise support a means for determining a first time location for a peak in data traffic for a set of multiple devices in communication with a communications network including the network node. In some examples, the peak timing component 1025 may be configured as or otherwise support a means for transmitting a signal that indicates a second time location for the peak in the data traffic for a subset of devices of the set of multiple devices based on a threshold for an overall peak in the data traffic for the set of multiple devices. The communications component 1030 may be configured as or otherwise support a means for communicating data including the data traffic with the subset of devices based on the signal indicating the second time location.

In some examples, to support determining the first time location, the QoS component 1035 may be configured as or otherwise support a means for receiving a message that establishes communications with the set of multiple devices and that indicates a first set of QOS parameters associated with the set of multiple devices. In some examples, to support determining the first time location, the QoS component 1035 may be configured as or otherwise support a means for communicating the data with the set of multiple devices in accordance with the first set of QoS parameters. In some examples, to support determining the first time location, the peak timing component 1025 may be configured as or otherwise support a means for estimating the first time location based on communicating the data.

In some examples, to support determining the first time location, the communications component 1030 may be configured as or otherwise support a means for establishing communications with the set of multiple devices according to a first set of QoS parameters. In some examples, to support determining the first time location, the peak timing component 1025 may be configured as or otherwise support a means for receiving a message that indicates the first time location.

In some examples, to support receiving the message, the QoS component 1035 may be configured as or otherwise support a means for receiving a QoS request from an edge server that operates according to a first clock configuration that is the same as a second clock configuration for the network node. In some examples, the message indicates the first time location, a first quantity of bits of the data at the first time location, a periodicity associated with the first quantity of bits of the data, an arrival phase associated with the first quantity of bits of the data, or any combination thereof. In some examples, the first time location corresponds to a time common to the network node and a device that transmits the message.

In some examples, to support transmitting the signal, the QoS response component 1040 may be configured as or otherwise support a means for transmitting a QoS response message that indicates a value of an offset between the first time location and the second time location. In some examples, the offset between the first time location and the second time location is based on communications parameters associated with the subset of devices.

In some examples, to support transmitting the signal, the signal transmitter 1045 may be configured as or otherwise support a means for transmitting the signal to an edge server via an NEF interface. In some examples, to support transmitting the signal, the signal transmitter 1045 may be configured as or otherwise support a means for transmitting the signal to a data network via an interface between a UPF of the network node and the data network.

In some examples, the peak timing component 1025 may be configured as or otherwise support a means for receiving an indication of the first time location from a UE. In some examples, the signal transmitter 1045 may be configured as or otherwise support a means for transmitting the signal to the UE based on determining the second time location.

In some examples, to support transmitting the signal, the signal transmitter 1045 may be configured as or otherwise support a means for transmitting a set of signals including at least the signal periodically, where each signal of the set of signals indicates a respective offset from the first time location for a respective subset of devices of the set of multiple devices.

In some examples, to support communicating the data, the communications component 1030 may be configured as or otherwise support a means for receiving the data from a data network in accordance with the second time location. In some examples, to support communicating the data, the communications component 1030 may be configured as or otherwise support a means for forwarding the data from the data network to the subset of devices in accordance with the second time location, the data including downlink data.

In some examples, to support communicating the data, the communications component 1030 may be configured as or otherwise support a means for receiving the data from a UE via an API in accordance with the second time location, the data including uplink data, where the UE is in communication with the subset of devices.

In some examples, the threshold for the overall peak in the data traffic corresponds to a threshold quantity of bits of the data traffic for the set of multiple devices. In some examples, the peak in the data traffic at the first time location exceeds the threshold. In some examples, the peak in the data traffic at the second time location is less than the threshold. In some examples, the data traffic includes uplink data, downlink data, or both associated with intra-coded frames, predicted frames, or both.

Figure 11:
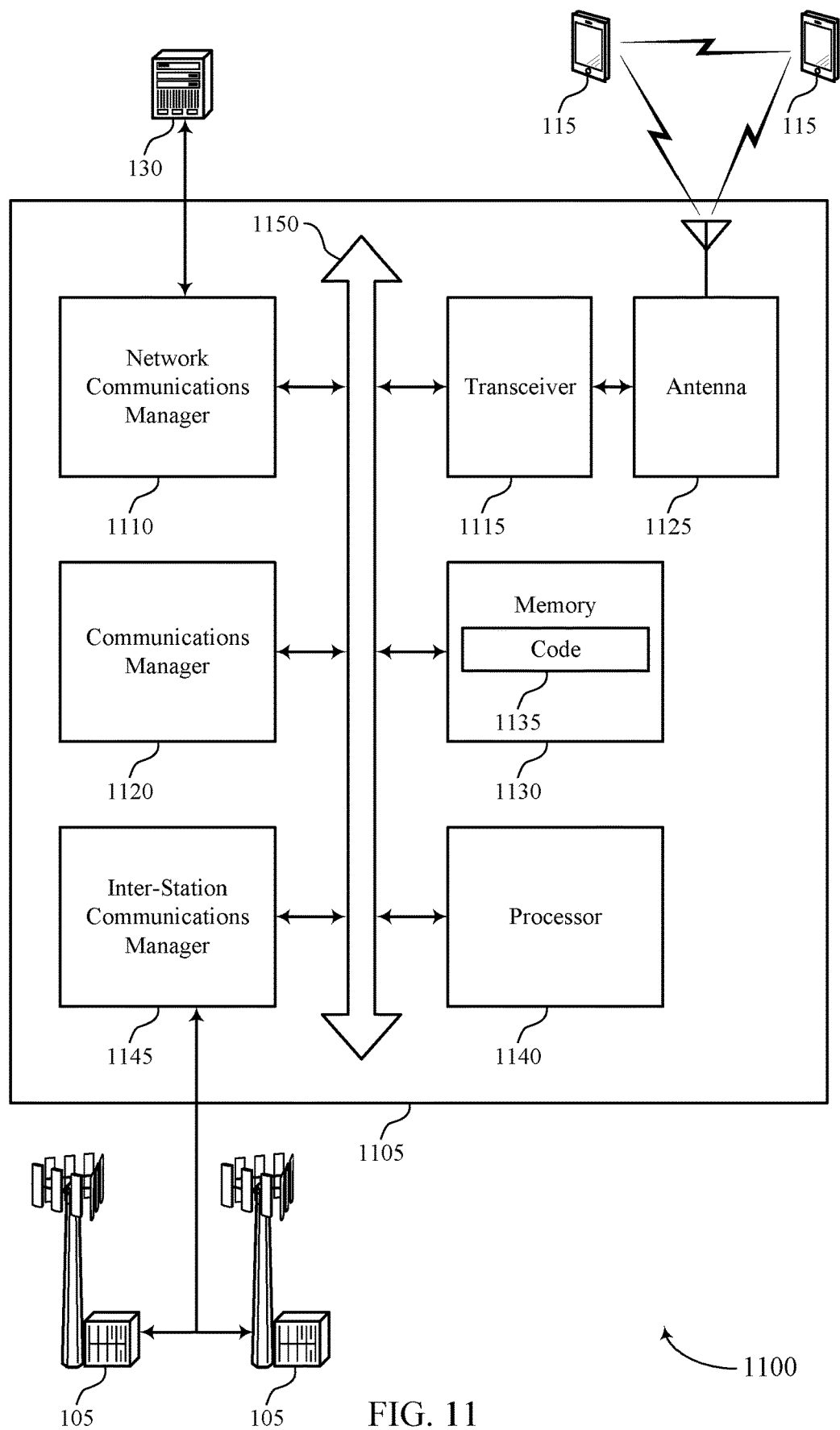
FIG. 11 shows a diagram of a system including a device that supports peak traffic position adjustment for wireless communication in accordance with aspects of the present disclosure.

FIG. 11 shows a diagram of a system 1100 including a device 1105 that supports peak traffic position adjustment for wireless communication in accordance with aspects of the present disclosure. The device 1105 may be an example of or include the components of a device 805, a device 905, or a Network Entity-ALPHA as described herein. The device 1105 may include components for bi-directional voice and data communications including components for transmitting and receiving communications, such as a communications manager 1120, a network communications manager 1110, a transceiver 1115, an antenna 1125, a memory 1130, code 1135, a processor 1140, and an inter-station communications manager 1145. These components may be in electronic communication or otherwise coupled (e.g., operatively, communicatively, functionally, electronically, electrically) via one or more buses (e.g., a bus 1150).

The network communications manager 1110 may manage communications with a core network 130 (e.g., via one or more wired backhaul links). For example, the network communications manager 1110 may manage the transfer of data communications for client devices, such as one or more UEs 115.

In some cases, the device 1105 may include a single antenna 1125. However, in some other cases the device 1105 may have more than one antenna 1125, which may be capable of concurrently transmitting or receiving multiple wireless transmissions. The transceiver 1115 may communicate bi-directionally, via the one or more antennas 1125, wired, or wireless links as described herein. For example, the transceiver 1115 may represent a wireless transceiver and may communicate bi-directionally with another wireless transceiver. The transceiver 1115 may also include a modem to modulate the packets, to provide the modulated packets to one or more antennas 1125 for transmission, and to demodulate packets received from the one or more antennas 1125. The transceiver 1115, or the transceiver 1115 and one or more antennas 1125, may be an example of a transmitter 815, a transmitter 915, a receiver 810, a receiver 910, or any combination thereof or component thereof, as described herein.

The memory 1130 may include RAM and ROM. The memory 1130 may store computer-readable, computer-executable code 1135 including instructions that, when executed by the processor 1140, cause the device 1105 to perform various functions described herein. The code 1135 may be stored in a non-transitory computer-readable medium such as system memory or another type of memory. In some cases, the code 1135 may not be directly executable by the processor 1140 but may cause a computer (e.g., when compiled and executed) to perform functions described herein. In some cases, the memory 1130 may contain, among other things, a BIOS which may control basic hardware or software operation such as the interaction with peripheral components or devices.

The processor 1140 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1140 may be configured to operate a memory array using a memory controller. In some other cases, a memory controller may be integrated into the processor 1140. The processor 1140 may be configured to execute computer-readable instructions stored in a memory (e.g., the memory 1130) to cause the device 1105 to perform various functions (e.g., functions or tasks supporting peak traffic position adjustment for wireless communication). For example, the device 1105 or a component of the device 1105 may include a processor 1140 and memory 1130 coupled to the processor 1140, the processor 1140 and memory 1130 configured to perform various functions described herein.

The inter-station communications manager 1145 may manage communications with other base stations 105, and may include a controller or scheduler for controlling communications with UEs 115 in cooperation with other base stations 105. For example, the inter-station communications manager 1145 may coordinate scheduling for transmissions to UEs 115 for various interference mitigation techniques such as beamforming or joint transmission. In some examples, the inter-station communications manager 1145 may provide an X2 interface within an LTE/LTE-A wireless communications network technology to provide communication between base stations 105.

The communications manager 1120 may support wireless communication at a network node in accordance with examples as disclosed herein. For example, the communications manager 1120 may be configured as or otherwise support a means for determining a first time location for a peak in data traffic for a set of multiple devices in communication with a communications network including the network node. The communications manager 1120 may be configured as or otherwise support a means for transmitting a signal that indicates a second time location for the peak in the data traffic for a subset of devices of the set of multiple devices based on a threshold for an overall peak in the data traffic for the set of multiple devices. The communications manager 1120 may be configured as or otherwise support a means for communicating data including the data traffic with the subset of devices based on the signal indicating the second time location.

By including or configuring the communications manager 1120 in accordance with examples as described herein, the device 1105 may support techniques for improved communication reliability, reduced latency, more efficient utilization of communication resources, improved coordination between devices, and improved utilization of processing capability.

In some examples, the communications manager 1120 may be configured to perform various operations (e.g., receiving, monitoring, transmitting) using or otherwise in cooperation with the transceiver 1115, the one or more antennas 1125, or any combination thereof. Although the communications manager 1120 is illustrated as a separate component, in some examples, one or more functions described with reference to the communications manager 1120 may be supported by or performed by the processor 1140, the memory 1130, the code 1135, or any combination thereof. For example, the code 1135 may include instructions executable by the processor 1140 to cause the device 1105 to perform various aspects of peak traffic position adjustment for wireless communication as described herein, or the processor 1140 and the memory 1130 may be otherwise configured to perform or support such operations.

Figure 12:
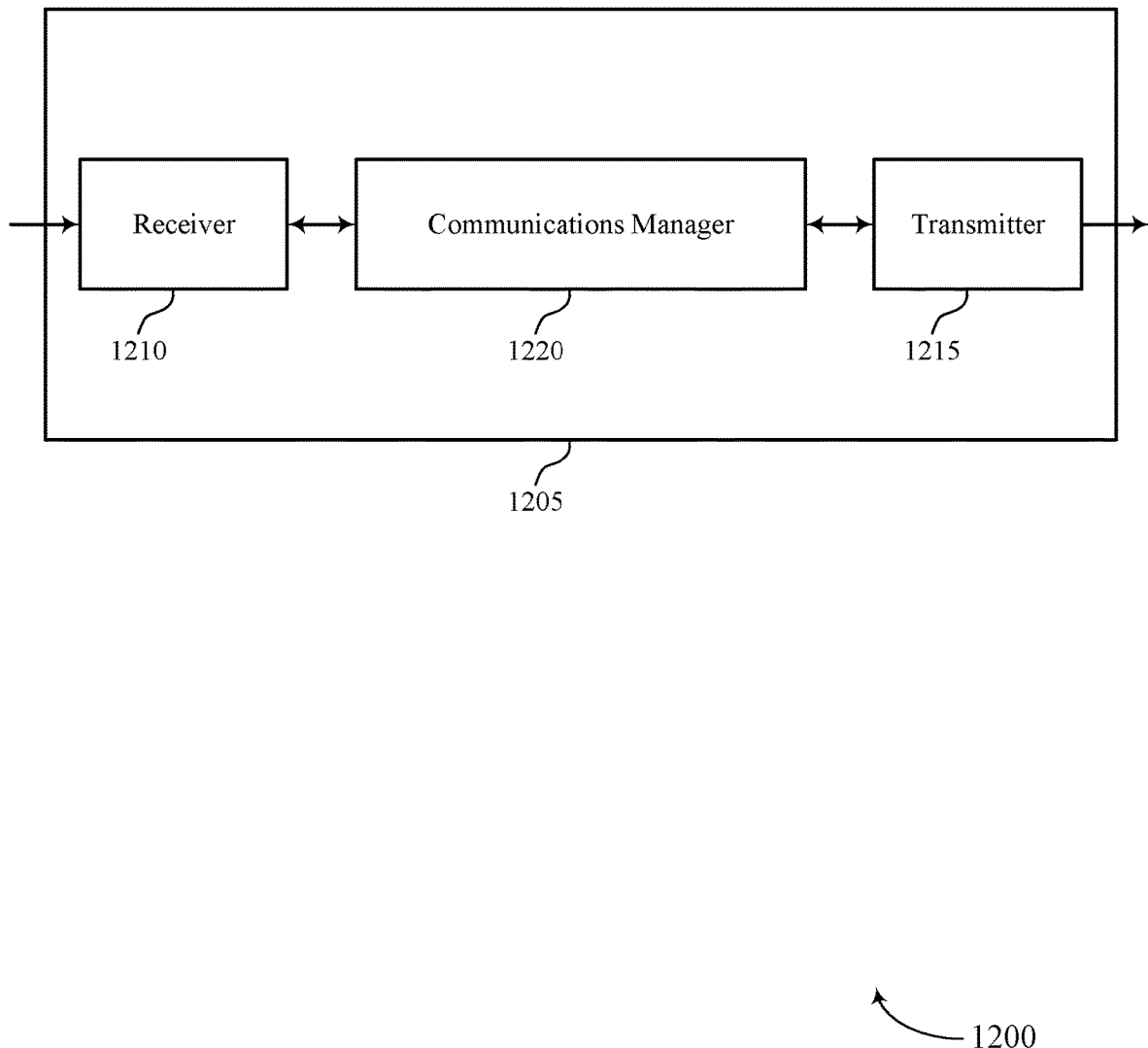
FIGS. 12 and 13 show block diagrams of devices that support peak traffic position adjustment for wireless communication in accordance with aspects of the present disclosure.

FIG. 12 shows a block diagram 1200 of a device 1205 that supports peak traffic position adjustment for wireless communication in accordance with aspects of the present disclosure. The device 1205 may be an example of aspects of a UE 115 as described herein. The device 1205 may include a receiver 1210, a transmitter 1215, and a communications manager 1220. The device 1205 may also include a processor. Each of these components may be in communication with one another (e.g., via one or more buses).

The receiver 1210 may provide a means for receiving information such as packets, user data, control information, or any combination thereof associated with various information channels (e.g., control channels, data channels, information channels related to peak traffic position adjustment for wireless communication). Information may be passed on to other components of the device 1205. The receiver 1210 may utilize a single antenna or a set of multiple antennas.

The transmitter 1215 may provide a means for transmitting signals generated by other components of the device 1205. For example, the transmitter 1215 may transmit information such as packets, user data, control information, or any combination thereof associated with various information channels (e.g., control channels, data channels, information channels related to peak traffic position adjustment for wireless communication). In some examples, the transmitter 1215 may be co-located with a receiver 1210 in a transceiver module. The transmitter 1215 may utilize a single antenna or a set of multiple antennas.

The communications manager 1220, the receiver 1210, the transmitter 1215, or various combinations thereof or various components thereof may be examples of means for performing various aspects of peak traffic position adjustment for wireless communication as described herein. For example, the communications manager 1220, the receiver 1210, the transmitter 1215, or various combinations or components thereof may support a method for performing one or more of the functions described herein.

In some examples, the communications manager 1220, the receiver 1210, the transmitter 1215, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 1220, the receiver 1210, the transmitter 1215, or various combinations or components thereof may be implemented in code (e.g., as communications management software or firmware) executed by a processor. If implemented in code executed by a processor, the functions of the communications manager 1220, the receiver 1210, the transmitter 1215, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 1220 may be configured to perform various operations (e.g., receiving, monitoring, transmitting) using or otherwise in cooperation with the receiver 1210, the transmitter 1215, or both. For example, the communications manager 1220 may receive information from the receiver 1210, send information to the transmitter 1215, or be integrated in combination with the receiver 1210, the transmitter 1215, or both to receive information, transmit information, or perform various other operations as described herein.

The communications manager 1220 may support wireless communication at a UE in accordance with examples as disclosed herein. For example, the communications manager 1220 may be configured as or otherwise support a means for transmitting a first signal that indicates a first time location for a peak in data traffic for the UE. The communications manager 1220 may be configured as or otherwise support a means for receiving a second signal that indicates a second time location for the peak in the data traffic based on a threshold for an overall peak in data traffic for the UE. The communications manager 1220 may be configured as or otherwise support a means for communicating data including the data traffic based on the second signal indicating the second time location.

By including or configuring the communications manager 1220 in accordance with examples as described herein, the device 1205 (e.g., a processor controlling or otherwise coupled to the receiver 1210, the transmitter 1215, the communications manager 1220, or a combination thereof) may support techniques for reduced processing, reduced overhead and more efficient utilization of communication resources. By adjusting a timing of a peak in data traffic, the device 1205 may reduce a total quantity of bits of data communicated at a time, which may support efficient utilization of communication resources and reduced processing and overhead by the processor of the device 1205. The processor may support communication of the data in accordance with QoS parameters for the device 1205, which may improve communication reliability.

Figure 13:
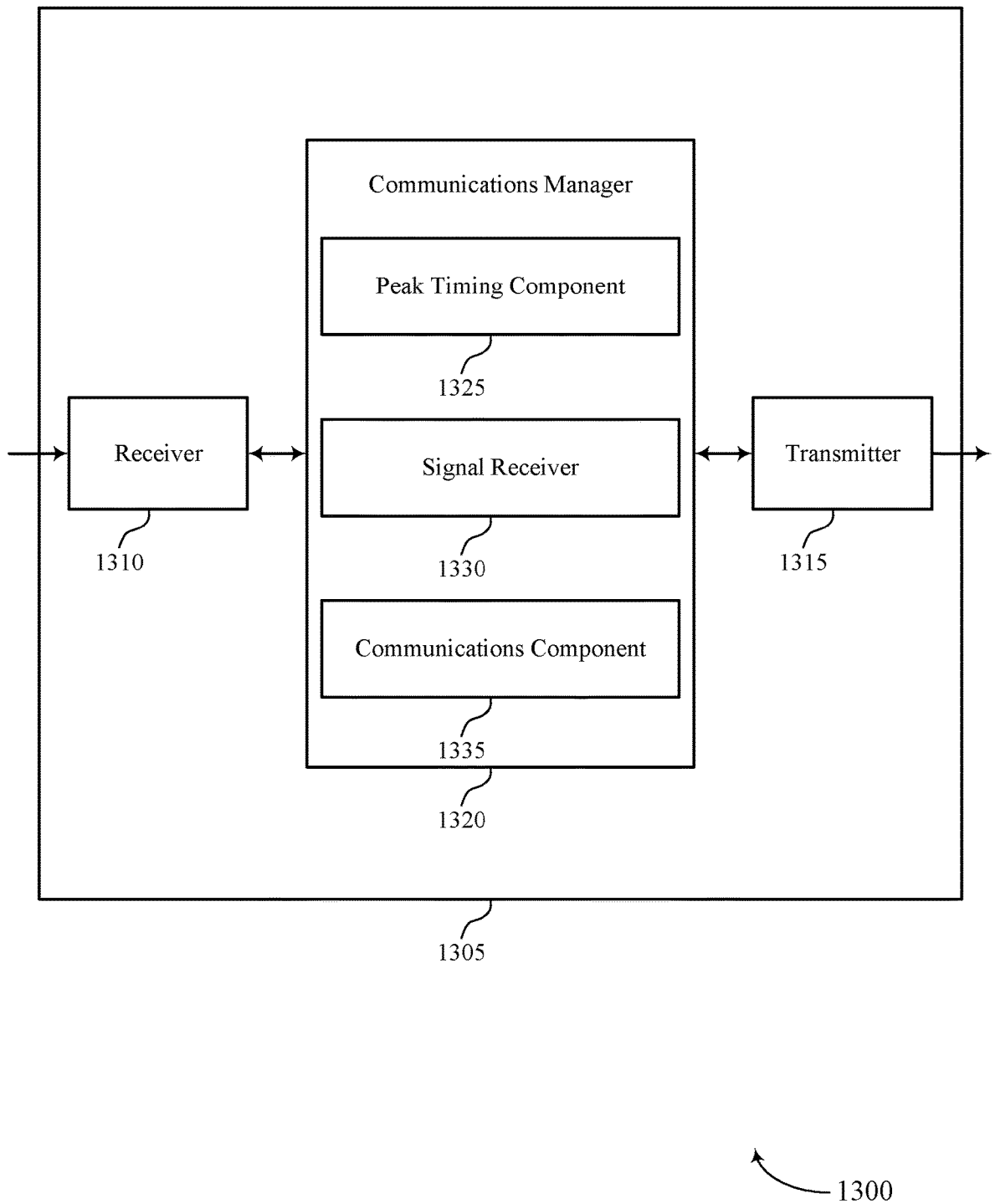

FIG. 13 shows a block diagram 1300 of a device 1305 that supports peak traffic position adjustment for wireless communication in accordance with aspects of the present disclosure. The device 1305 may be an example of aspects of a device 1205 or a UE 115 as described herein. The device 1305 may include a receiver 1310, a transmitter 1315, and a communications manager 1320. The device 1305 may also include a processor. Each of these components may be in communication with one another (e.g., via one or more buses).

The receiver 1310 may provide a means for receiving information such as packets, user data, control information, or any combination thereof associated with various information channels (e.g., control channels, data channels, information channels related to peak traffic position adjustment for wireless communication). Information may be passed on to other components of the device 1305. The receiver 1310 may utilize a single antenna or a set of multiple antennas.

The transmitter 1315 may provide a means for transmitting signals generated by other components of the device 1305. For example, the transmitter 1315 may transmit information such as packets, user data, control information, or any combination thereof associated with various information channels (e.g., control channels, data channels, information channels related to peak traffic position adjustment for wireless communication). In some examples, the transmitter 1315 may be co-located with a receiver 1310 in a transceiver module. The transmitter 1315 may utilize a single antenna or a set of multiple antennas.

The device 1305, or various components thereof, may be an example of means for performing various aspects of peak traffic position adjustment for wireless communication as described herein. For example, the communications manager 1320 may include a peak timing component 1325, a signal receiver 1330, a communications component 1335, or any combination thereof. The communications manager 1320 may be an example of aspects of a communications manager 1220 as described herein. In some examples, the communications manager 1320, or various components thereof, may be configured to perform various operations (e.g., receiving, monitoring, transmitting) using or otherwise in cooperation with the receiver 1310, the transmitter 1315, or both. For example, the communications manager 1320 may receive information from the receiver 1310, send information to the transmitter 1315, or be integrated in combination with the receiver 1310, the transmitter 1315, or both to receive information, transmit information, or perform various other operations as described herein.

The communications manager 1320 may support wireless communication at a UE in accordance with examples as disclosed herein. The peak timing component 1325 may be configured as or otherwise support a means for transmitting a first signal that indicates a first time location for a peak in data traffic for the UE. The signal receiver 1330 may be configured as or otherwise support a means for receiving a second signal that indicates a second time location for the peak in the data traffic based on a threshold for an overall peak in data traffic for the UE. The communications component 1335 may be configured as or otherwise support a means for communicating data including the data traffic based on the second signal indicating the second time location.

Figure 14:
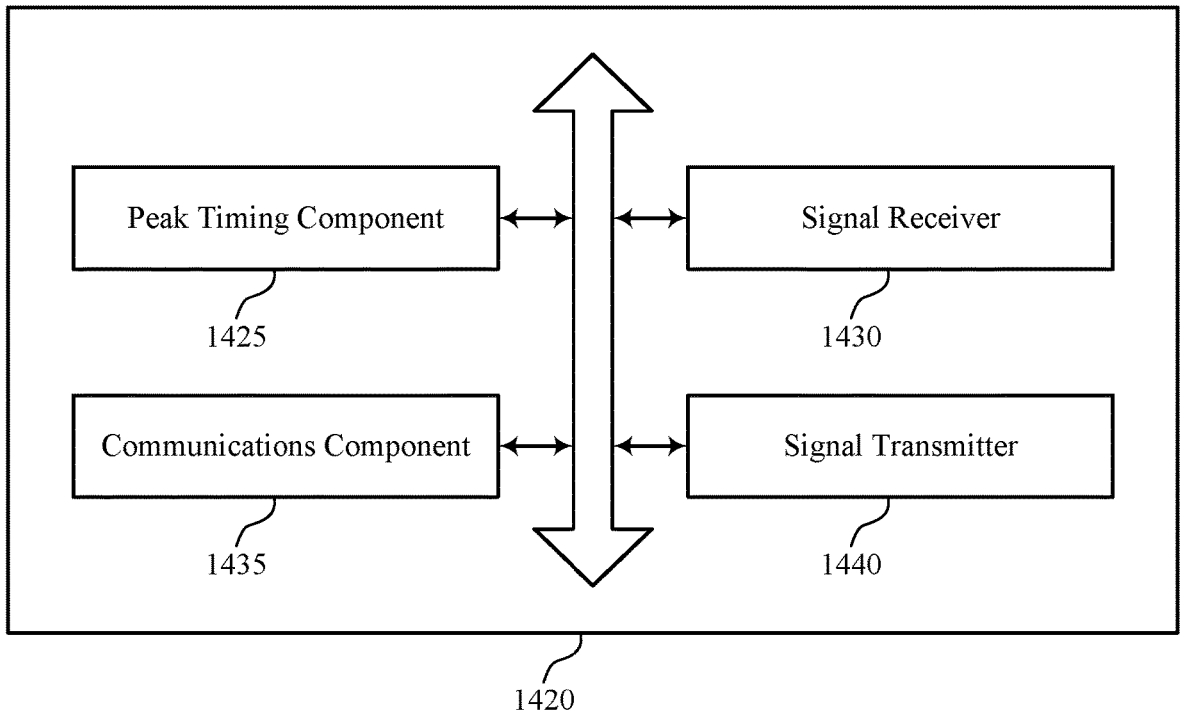
FIG. 14 shows a block diagram of a communications manager that supports peak traffic position adjustment for wireless communication in accordance with aspects of the present disclosure.

FIG. 14 shows a block diagram 1400 of a communications manager 1420 that supports peak traffic position adjustment for wireless communication in accordance with aspects of the present disclosure. The communications manager 1420 may be an example of aspects of a communications manager 1220, a communications manager 1320, or both, as described herein. The communications manager 1420, or various components thereof, may be an example of means for performing various aspects of peak traffic position adjustment for wireless communication as described herein. For example, the communications manager 1420 may include a peak timing component 1425, a signal receiver 1430, a communications component 1435, a signal transmitter 1440, or any combination thereof. Each of these components may communicate, directly or indirectly, with one another (e.g., via one or more buses).

The communications manager 1420 may support wireless communication at a UE in accordance with examples as disclosed herein. The peak timing component 1425 may be configured as or otherwise support a means for transmitting a first signal that indicates a first time location for a peak in data traffic for the UE. The signal receiver 1430 may be configured as or otherwise support a means for receiving a second signal that indicates a second time location for the peak in the data traffic based on a threshold for an overall peak in data traffic for the UE. The communications component 1435 may be configured as or otherwise support a means for communicating data including the data traffic based on the second signal indicating the second time location.

In some examples, to support determining the first time location, the communications component 1435 may be configured as or otherwise support a means for communicating the data with a device via a cross-layer API. In some examples, to support determining the first time location, the peak timing component 1425 may be configured as or otherwise support a means for estimating the first time location based on communicating the data.

In some examples, to support determining the first time location, the communications component 1435 may be configured as or otherwise support a means for establishing communications between the UE and a device. In some examples, to support determining the first time location, the signal receiver 1430 may be configured as or otherwise support a means for receiving, from the device via a cross-layer API, a message that indicates the first time location.

In some examples, the signal transmitter 1440 may be configured as or otherwise support a means for transmitting, to a device via a cross-layer API, a third signal that indicates the second time location, where the communicating is based on the third signal. In some examples, an offset between the first time location and the second time location is based on communications parameters associated with a device in communication with the UE. In some examples, the data includes uplink data, downlink data, or both.

Figure 15:
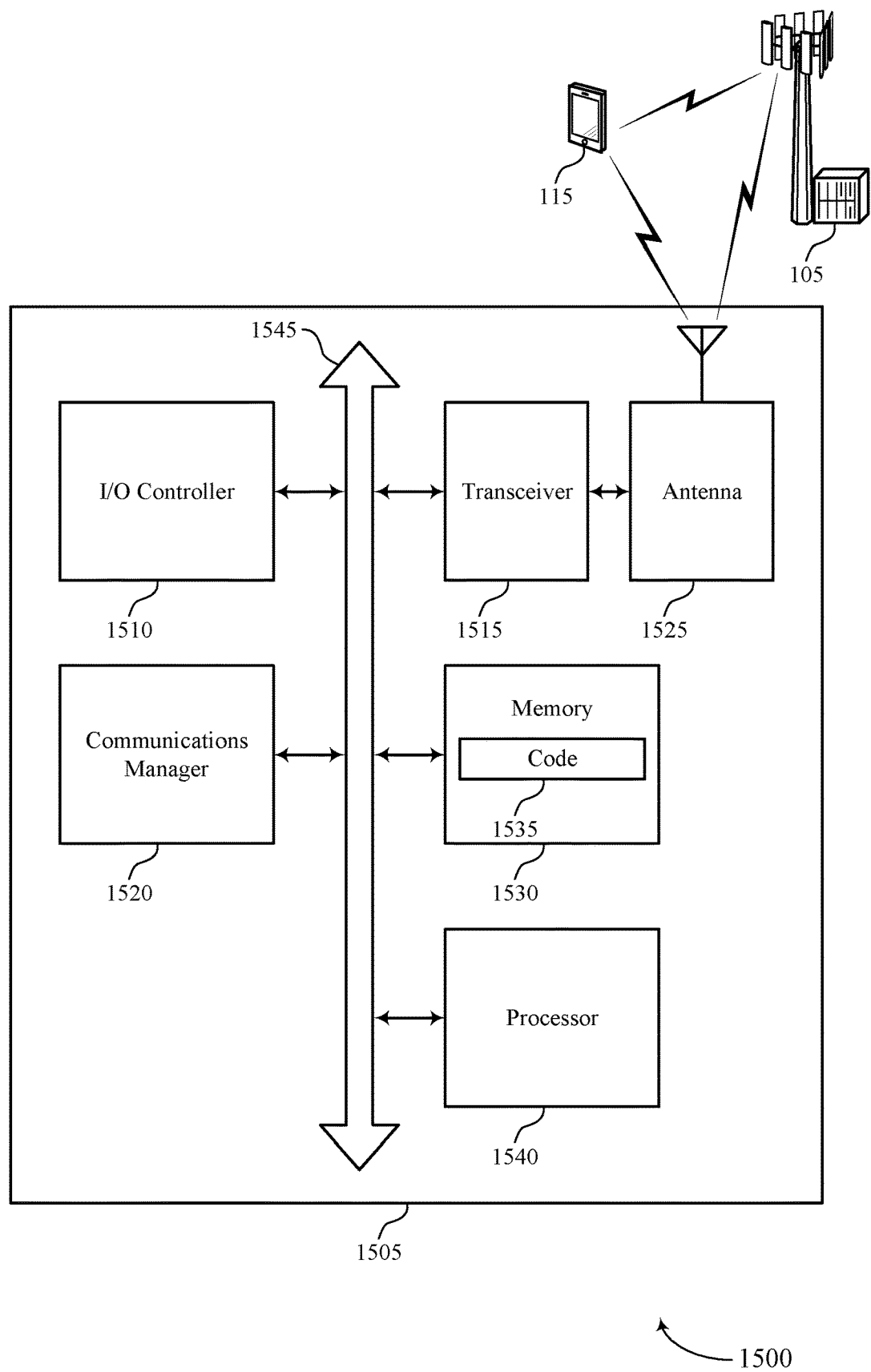
FIG. 15 shows a diagram of a system including a device that supports peak traffic position adjustment for wireless communication in accordance with aspects of the present disclosure.

FIG. 15 shows a diagram of a system 1500 including a device 1505 that supports peak traffic position adjustment for wireless communication in accordance with aspects of the present disclosure. The device 1505 may be an example of or include the components of a device 1205, a device 1305, or a UE 115 as described herein. The device 1505 may communicate wirelessly with one or more base stations 105, UEs 115, or any combination thereof. The device 1505 may include components for bi-directional voice and data communications including components for transmitting and receiving communications, such as a communications manager 1520, an input/output (I/O) controller 1510, a transceiver 1515, an antenna 1525, a memory 1530, code 1535, and a processor 1540. These components may be in electronic communication or otherwise coupled (e.g., operatively, communicatively, functionally, electronically, electrically) via one or more buses (e.g., a bus 1545).

The I/O controller 1510 may manage input and output signals for the device 1505. The I/O controller 1510 may also manage peripherals not integrated into the device 1505. In some cases, the I/O controller 1510 may represent a physical connection or port to an external peripheral. In some cases, the I/O controller 1510 may utilize an operating system such as iOS®, ANDROID®, MS-DOS®, MS-WINDOWS®, OS/2®, UNIX®, LINUX®, or another known operating system. Additionally or alternatively, the I/O controller 1510 may represent or interact with a modem, a keyboard, a mouse, a touchscreen, or a similar device. In some cases, the I/O controller 1510 may be implemented as part of a processor, such as the processor 1540. In some cases, a user may interact with the device 1505 via the I/O controller 1510 or via hardware components controlled by the I/O controller 1510.

In some cases, the device 1505 may include a single antenna 1525. However, in some other cases, the device 1505 may have more than one antenna 1525, which may be capable of concurrently transmitting or receiving multiple wireless transmissions. The transceiver 1515 may communicate bi-directionally, via the one or more antennas 1525, wired, or wireless links as described herein. For example, the transceiver 1515 may represent a wireless transceiver and may communicate bi-directionally with another wireless transceiver. The transceiver 1515 may also include a modem to modulate the packets, to provide the modulated packets to one or more antennas 1525 for transmission, and to demodulate packets received from the one or more antennas 1525. The transceiver 1515, or the transceiver 1515 and one or more antennas 1525, may be an example of a transmitter 1215, a transmitter 1315, a receiver 1210, a receiver 1310, or any combination thereof or component thereof, as described herein.

The memory 1530 may include random access memory (RAM) and read-only memory (ROM). The memory 1530 may store computer-readable, computer-executable code 1535 including instructions that, when executed by the processor 1540, cause the device 1505 to perform various functions described herein. The code 1535 may be stored in a non-transitory computer-readable medium such as system memory or another type of memory. In some cases, the code 1535 may not be directly executable by the processor 1540 but may cause a computer (e.g., when compiled and executed) to perform functions described herein. In some cases, the memory 1530 may contain, among other things, a basic I/O system (BIOS) which may control basic hardware or software operation such as the interaction with peripheral components or devices.

The processor 1540 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1540 may be configured to operate a memory array using a memory controller. In some other cases, a memory controller may be integrated into the processor 1540. The processor 1540 may be configured to execute computer-readable instructions stored in a memory (e.g., the memory 1530) to cause the device 1505 to perform various functions (e.g., functions or tasks supporting peak traffic position adjustment for wireless communication). For example, the device 1505 or a component of the device 1505 may include a processor 1540 and memory 1530 coupled to the processor 1540, the processor 1540 and memory 1530 configured to perform various functions described herein.

The communications manager 1520 may support wireless communication at a UE in accordance with examples as disclosed herein. For example, the communications manager 1520 may be configured as or otherwise support a means for transmitting a first signal that indicates a first time location for a peak in data traffic for the UE. The communications manager 1520 may be configured as or otherwise support a means for receiving a second signal that indicates a second time location for the peak in the data traffic based on a threshold for an overall peak in data traffic for the UE. The communications manager 1520 may be configured as or otherwise support a means for communicating data including the data traffic based on the second signal indicating the second time location.

In some examples, the communications manager 1520 may be configured to perform various operations (e.g., receiving, monitoring, transmitting) using or otherwise in cooperation with the transceiver 1515, the one or more antennas 1525, or any combination thereof. Although the communications manager 1520 is illustrated as a separate component, in some examples, one or more functions described with reference to the communications manager 1520 may be supported by or performed by the processor 1540, the memory 1530, the code 1535, or any combination thereof. For example, the code 1535 may include instructions executable by the processor 1540 to cause the device 1505 to perform various aspects of peak traffic position adjustment for wireless communication as described herein, or the processor 1540 and the memory 1530 may be otherwise configured to perform or support such operations.

Figure 16:
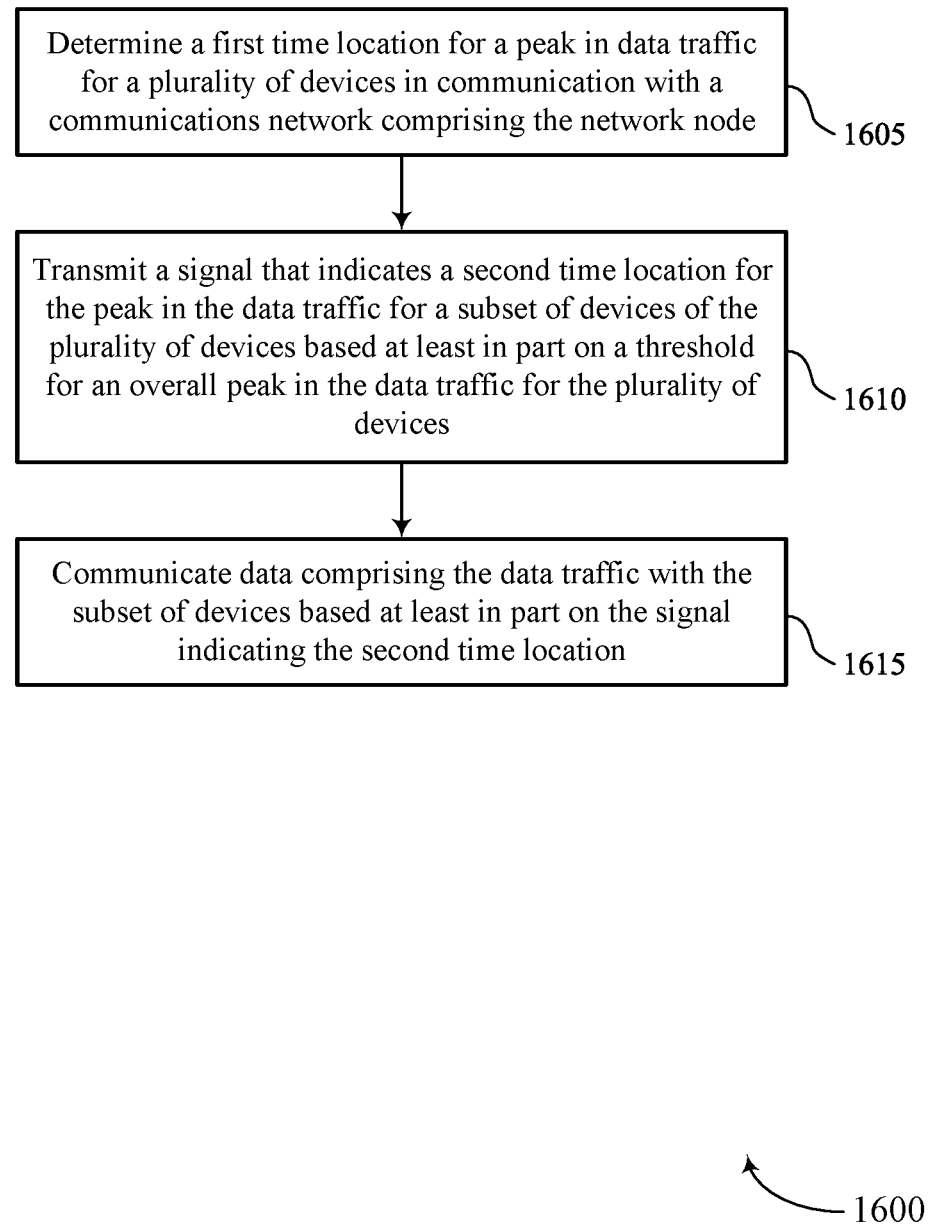
FIGS. 16 through 20 show flowcharts illustrating methods that support peak traffic position adjustment for wireless communication in accordance with aspects of the present disclosure.

FIG. 16 shows a flowchart illustrating a method 1600 that supports peak traffic position adjustment for wireless communication in accordance with aspects of the present disclosure. The operations of the method 1600 may be implemented by a Network Entity-ALPHA or its components as described herein. For example, the operations of the method 1600 may be performed by a Network Entity-ALPHA as described with reference to FIGS. 1 through 11. In some examples, a Network Entity-ALPHA may execute a set of instructions to control the functional elements of the Network Entity-ALPHA to perform the described functions. Additionally or alternatively, the Network Entity-ALPHA may perform aspects of the described functions using special-purpose hardware.

At 1605, the method may include determining a first time location for a peak in data traffic for a set of multiple devices in communication with a communications network including the network node. The operations of 1605 may be performed in accordance with examples as disclosed herein. In some examples, aspects of the operations of 1605 may be performed by a peak timing component 1025 as described with reference to FIG. 10.

At 1610, the method may include transmitting a signal that indicates a second time location for the peak in the data traffic for a subset of devices of the set of multiple devices based on a threshold for an overall peak in the data traffic for the set of multiple devices. The operations of 1610 may be performed in accordance with examples as disclosed herein. In some examples, aspects of the operations of 1610 may be performed by a peak timing component 1025 as described with reference to FIG. 10.

At 1615, the method may include communicating data including the data traffic with the subset of devices based on the signal indicating the second time location. The operations of 1615 may be performed in accordance with examples as disclosed herein. In some examples, aspects of the operations of 1615 may be performed by a communications component 1030 as described with reference to FIG. 10.

Figure 17:
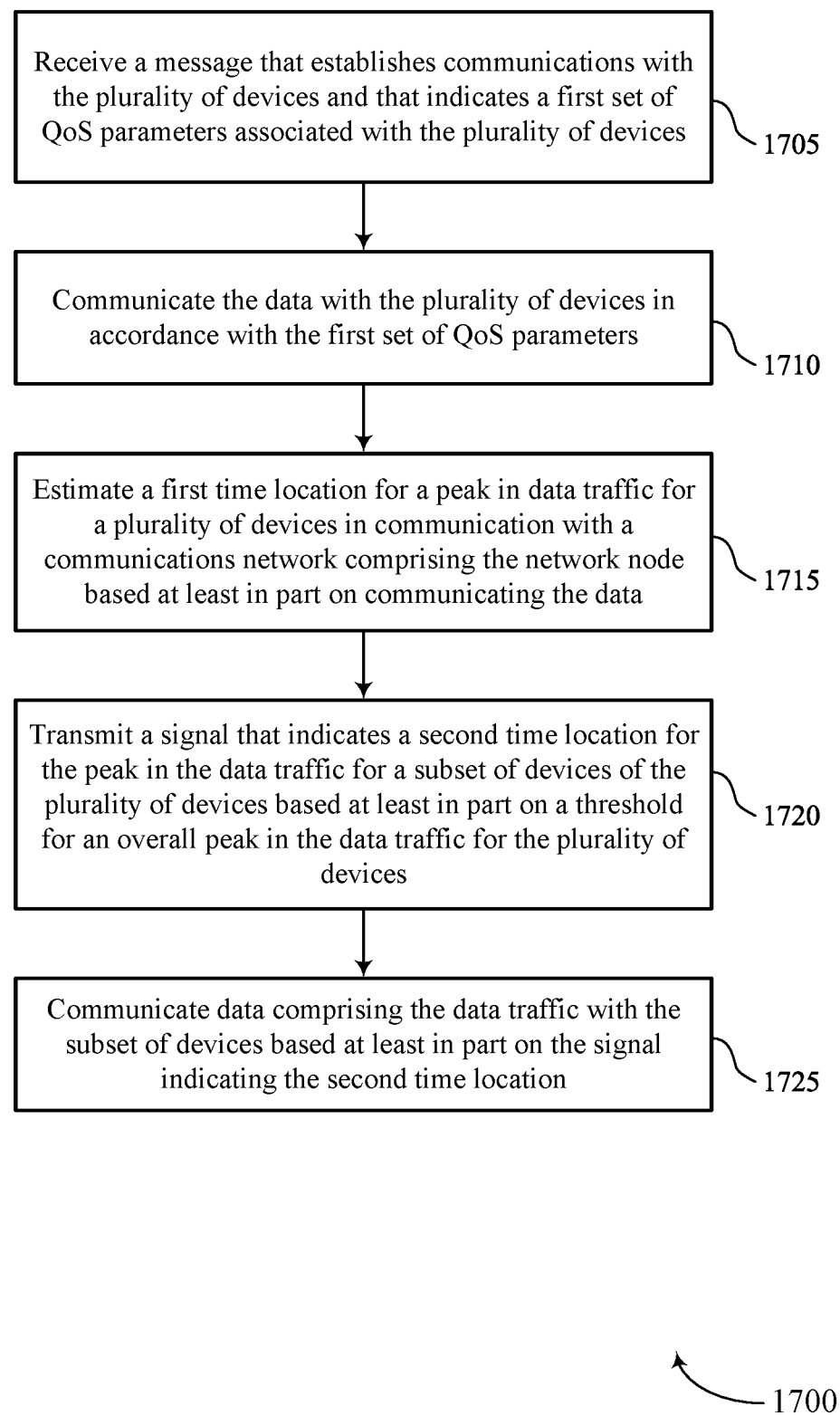

FIG. 17 shows a flowchart illustrating a method 1700 that supports peak traffic position adjustment for wireless communication in accordance with aspects of the present disclosure. The operations of the method 1700 may be implemented by a Network Entity-ALPHA or its components as described herein. For example, the operations of the method 1700 may be performed by a Network Entity-ALPHA as described with reference to FIGS. 1 through 11. In some examples, a Network Entity-ALPHA may execute a set of instructions to control the functional elements of the Network Entity-ALPHA to perform the described functions. Additionally or alternatively, the Network Entity-ALPHA may perform aspects of the described functions using special-purpose hardware.

At 1705, the method may include receiving a message that establishes communications with the set of multiple devices and that indicates a first set of QoS parameters associated with the set of multiple devices. The operations of 1705 may be performed in accordance with examples as disclosed herein. In some examples, aspects of the operations of 1705 may be performed by a QoS component 1035 as described with reference to FIG. 10.

At 1710, the method may include communicating the data with the set of multiple devices in accordance with the first set of QoS parameters. The operations of 1710 may be performed in accordance with examples as disclosed herein. In some examples, aspects of the operations of 1710 may be performed by a QoS component 1035 as described with reference to FIG. 10.

At 1715, the method may include estimating a first time location for a peak in data traffic for a set of multiple devices in communication with a communications network including the network node based on communicating the data. The operations of 1715 may be performed in accordance with examples as disclosed herein. In some examples, aspects of the operations of 1715 may be performed by a peak timing component 1025 as described with reference to FIG. 10.

At 1720, the method may include transmitting a signal that indicates a second time location for the peak in the data traffic for a subset of devices of the set of multiple devices based on a threshold for an overall peak in the data traffic for the set of multiple devices. The operations of 1720 may be performed in accordance with examples as disclosed herein. In some examples, aspects of the operations of 1720 may be performed by a peak timing component 1025 as described with reference to FIG. 10.

At 1725, the method may include communicating data including the data traffic with the subset of devices based on the signal indicating the second time location. The operations of 1725 may be performed in accordance with examples as disclosed herein. In some examples, aspects of the operations of 1725 may be performed by a communications component 1030 as described with reference to FIG. 10.

Figure 18:
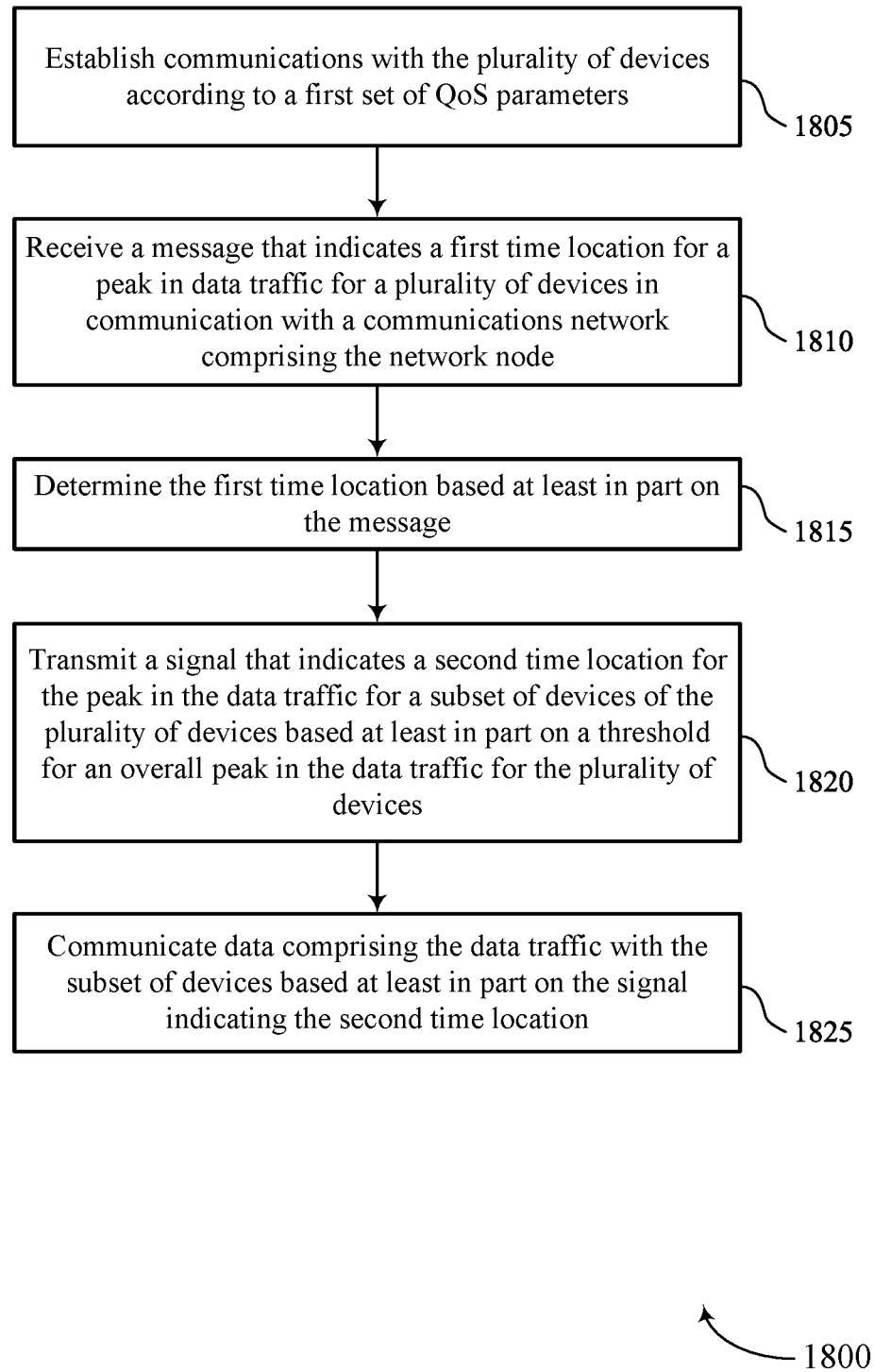

FIG. 18 shows a flowchart illustrating a method 1800 that supports peak traffic position adjustment for wireless communication in accordance with aspects of the present disclosure. The operations of the method 1800 may be implemented by a Network Entity-ALPHA or its components as described herein. For example, the operations of the method 1800 may be performed by a Network Entity-ALPHA as described with reference to FIGS. 1 through 11. In some examples, a Network Entity-ALPHA may execute a set of instructions to control the functional elements of the Network Entity-ALPHA to perform the described functions. Additionally or alternatively, the Network Entity-ALPHA may perform aspects of the described functions using special-purpose hardware.

At 1805, the method may include establishing communications with the set of multiple devices according to a first set of QoS parameters. The operations of 1805 may be performed in accordance with examples as disclosed herein. In some examples, aspects of the operations of 1805 may be performed by a communications component 1030 as described with reference to FIG. 10.

At 1810, the method may include receiving a message that indicates a first time location for a peak in data traffic for a set of multiple devices in communication with a communications network including the network node. The operations of 1810 may be performed in accordance with examples as disclosed herein. In some examples, aspects of the operations of 1810 may be performed by a peak timing component 1025 as described with reference to FIG. 10.

At 1815, the method may include determining the first time location based on the message. The operations of 1815 may be performed in accordance with examples as disclosed herein. In some examples, aspects of the operations of 1815 may be performed by a peak timing component 1025 as described with reference to FIG. 10.

At 1820, the method may include transmitting a signal that indicates a second time location for the peak in the data traffic for a subset of devices of the set of multiple devices based on a threshold for an overall peak in the data traffic for the set of multiple devices. The operations of 1820 may be performed in accordance with examples as disclosed herein. In some examples, aspects of the operations of 1820 may be performed by a peak timing component 1025 as described with reference to FIG. 10.

At 1825, the method may include communicating data including the data traffic with the subset of devices based on the signal indicating the second time location. The operations of 1825 may be performed in accordance with examples as disclosed herein. In some examples, aspects of the operations of 1825 may be performed by a communications component 1030 as described with reference to FIG. 10.

Figure 19:
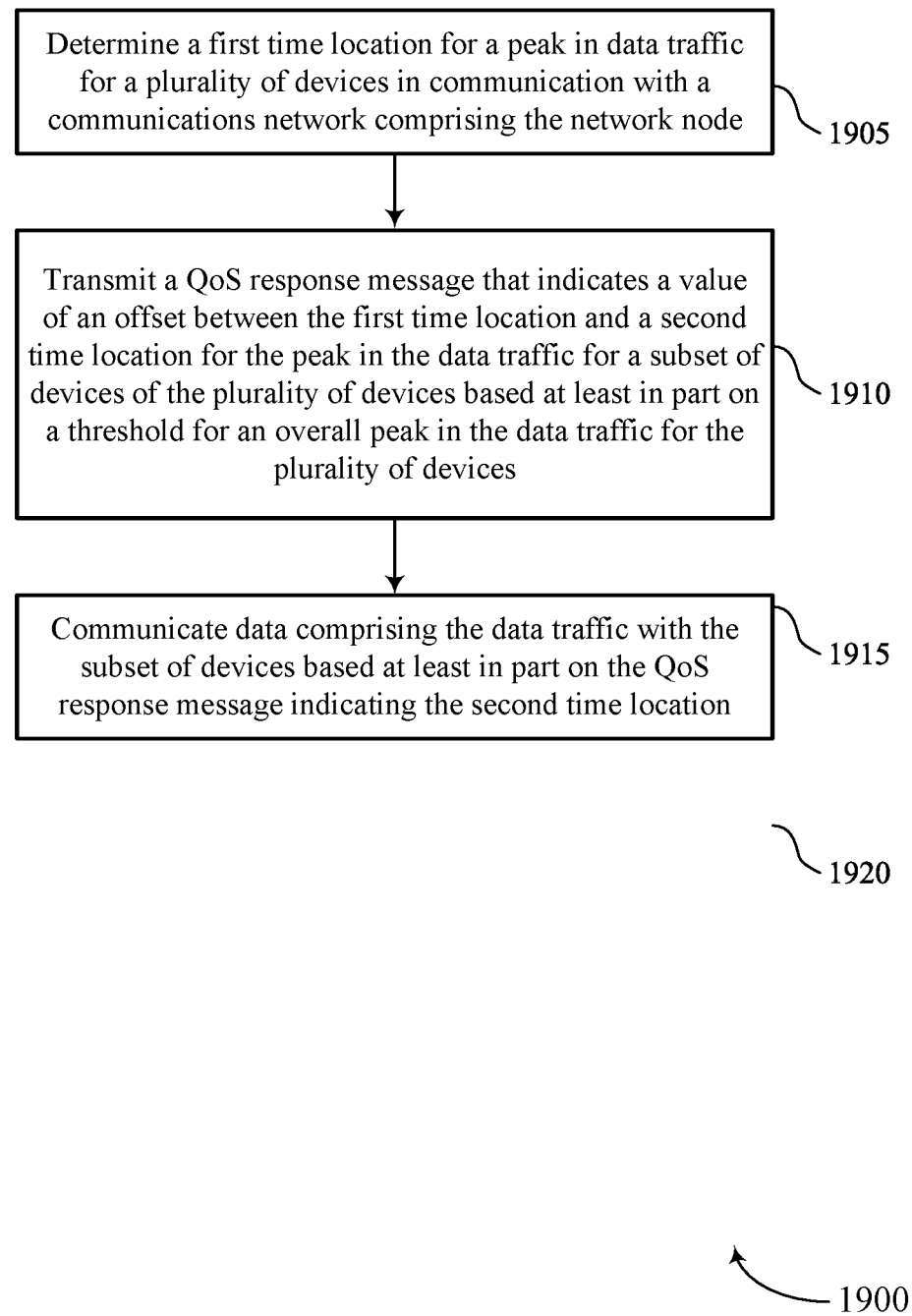

FIG. 19 shows a flowchart illustrating a method 1900 that supports peak traffic position adjustment for wireless communication in accordance with aspects of the present disclosure. The operations of the method 1900 may be implemented by a Network Entity-ALPHA or its components as described herein. For example, the operations of the method 1900 may be performed by a Network Entity-ALPHA as described with reference to FIGS. 1 through 11. In some examples, a Network Entity-ALPHA may execute a set of instructions to control the functional elements of the Network Entity-ALPHA to perform the described functions. Additionally or alternatively, the Network Entity-ALPHA may perform aspects of the described functions using special-purpose hardware.

At 1905, the method may include determining a first time location for a peak in data traffic for a set of multiple devices in communication with a communications network including the network node. The operations of 1905 may be performed in accordance with examples as disclosed herein. In some examples, aspects of the operations of 1905 may be performed by a peak timing component 1025 as described with reference to FIG. 10.

At 1910, the method may include transmitting a QoS response message that indicates a value of an offset between the first time location and a second time location for the peak in the data traffic for a subset of devices of the set of multiple devices based on a threshold for an overall peak in the data traffic for the set of multiple devices. The operations of 1910 may be performed in accordance with examples as disclosed herein. In some examples, aspects of the operations of 1910 may be performed by a peak timing component 1025 as described with reference to FIG. 10.

At 1915, the method may include communicating data including the data traffic with the subset of devices based on the QoS response message indicating the second time location. The operations of 1915 may be performed in accordance with examples as disclosed herein. In some examples, aspects of the operations of 1915 may be performed by a communications component 1030 as described with reference to FIG. 10.

Figure 20:
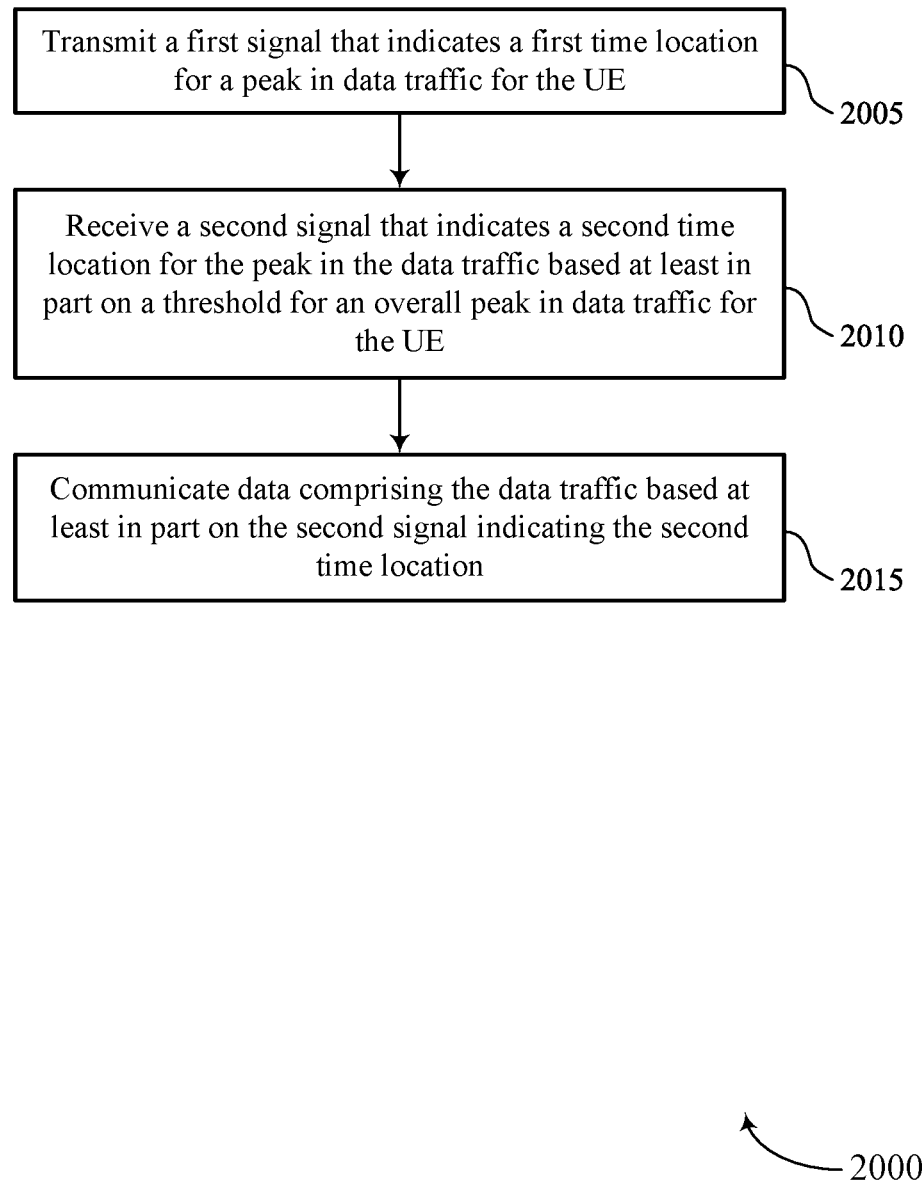

FIG. 20 shows a flowchart illustrating a method 2000 that supports peak traffic position adjustment for wireless communication in accordance with aspects of the present disclosure. The operations of the method 2000 may be implemented by a UE or its components as described herein. For example, the operations of the method 2000 may be performed by a UE 115 as described with reference to FIGS. 1 through 7 and 12 through 15. In some examples, a UE may execute a set of instructions to control the functional elements of the UE to perform the described functions. Additionally or alternatively, the UE may perform aspects of the described functions using special-purpose hardware.

At 2005, the method may include transmitting a first signal that indicates a first time location for a peak in data traffic for the UE. The operations of 2005 may be performed in accordance with examples as disclosed herein. In some examples, aspects of the operations of 2005 may be performed by a peak timing component 1425 as described with reference to FIG. 14.

At 2010, the method may include receiving a second signal that indicates a second time location for the peak in the data traffic based on a threshold for an overall peak in data traffic for the UE. The operations of 2010 may be performed in accordance with examples as disclosed herein.

In some examples, aspects of the operations of 2010 may be performed by a signal receiver 1430 as described with reference to FIG. 14.

At 2015, the method may include communicating data including the data traffic based on the second signal indicating the second time location. The operations of 2015 may be performed in accordance with examples as disclosed herein. In some examples, aspects of the operations of 2015 may be performed by a communications component 1435 as described with reference to FIG. 14.

The following provides an overview of aspects of the present disclosure:

Aspect 1: A method for wireless communication at a network node, comprising: determining a first time location for a peak in data traffic for a plurality of devices in communication with a communications network comprising the network node: transmitting a signal that indicates a second time location for the peak in the data traffic for a subset of devices of the plurality of devices based at least in part on a threshold for an overall peak in the data traffic for the plurality of devices; and communicating data comprising the data traffic with the subset of devices based at least in part on the signal indicating the second time location.

Aspect 2: The method of aspect 1, wherein determining the first time location comprises: receiving a message that establishes communications with the plurality of devices and that indicates a first set of QoS parameters associated with the plurality of devices: communicating the data with the plurality of devices in accordance with the first set of QoS parameters; and estimating the first time location based at least in part on communicating the data.

Aspect 3: The method of aspect 1, wherein determining the first time location comprises: establishing communications with the plurality of devices according to a first set of QoS parameters; and receiving a message that indicates the first time location.

Aspect 4: The method of aspect 3, wherein receiving the message comprises: receiving a QoS request from an edge server that operates according to a first clock configuration that is the same as a second clock configuration for the network node.

Aspect 5: The method of any of aspects 3 through 4, wherein: the message indicates the first time location, a first quantity of bits of the data at the first time location, a periodicity associated with the first quantity of bits of the data, an arrival phase associated with the first quantity of bits of the data, or any combination thereof; and the first time location corresponds to a time common to the network node and a device that transmits the message.

Aspect 6: The method of any of aspects 1 through 5, wherein transmitting the signal comprises: transmitting a QoS response message that indicates a value of an offset between the first time location and the second time location.

Aspect 7: The method of aspect 6, wherein the offset between the first time location and the second time location is based at least in part on communications parameters associated with the subset of devices.

Aspect 8: The method of any of aspects 1 through 7, wherein transmitting the signal comprises: transmitting the signal to an edge server via an NEF interface.

Aspect 9: The method of any of aspects 1 through 7, wherein transmitting the signal comprises: transmitting the signal to a data network via an interface between a UPF of the network node and the data network.

Aspect 10: The method of any of aspects 1 through 9, further comprising: receiving an indication of the first time location from a UE; and transmitting the signal to the UE based at least in part on determining the second time location.

Aspect 11: The method of any of aspects 1 through 10, wherein transmitting the signal comprises: transmitting a set of signals comprising at least the signal periodically, wherein each signal of the set of signals indicates a respective offset from the first time location for a respective subset of devices of the plurality of devices.

Aspect 12: The method of any of aspects 1 through 11, wherein communicating the data comprises: receiving the data from a data network in accordance with the second time location; and forwarding the data from the data network to the subset of devices in accordance with the second time location, the data comprising downlink data.

Aspect 13: The method of any of aspects 1 through 1112, wherein communicating the data comprises: receiving the data from a UE via an API in accordance with the second time location, the data comprising uplink data, wherein the UE is in communication with the subset of devices.

Aspect 14: The method of any of aspects 1 through 13, wherein: the threshold for the overall peak in the data traffic corresponds to a threshold quantity of bits of the data traffic for the plurality of devices: the peak in the data traffic at the first time location exceeds the threshold; and the peak in the data traffic at the second time location is less than the threshold.

Aspect 15: The method of any of aspects 1 through 14, wherein the data traffic comprises uplink data, downlink data, or both associated with intra-coded frames, predicted frames, or both.

Aspect 16: A method for wireless communication at a UE, comprising: transmitting a first signal that indicates a first time location for a peak in data traffic for the UE: receiving a second signal that indicates a second time location for the peak in the data traffic based at least in part on a threshold for an overall peak in data traffic for the UE; and communicating data comprising the data traffic based at least in part on the second signal indicating the second time location.

Aspect 17: The method of aspect 16, wherein determining the first time location comprises: communicating the data with a device via a cross-layer API; and estimating the first time location based at least in part on communicating the data.

Aspect 18: The method of aspect 16, wherein determining the first time location comprises: establishing communications between the UE and a device; and receiving, from the device via a cross-layer API, a message that indicates the first time location.

Aspect 19: The method of any of aspects 16 through 18, further comprising: transmitting, to a device via a cross-layer API, a third signal that indicates the second time location, wherein the communicating is based at least in part on the third signal.

Aspect 20: The method of any of aspects 16 through 19, wherein an offset between the first time location and the second time location is based at least in part on communications parameters associated with a device in communication with the UE.

Aspect 21: The method of any of aspects 16 through 20, wherein the data comprises uplink data, downlink data, or both.

Aspect 22: An apparatus for wireless communication at a network node, comprising a processor: memory coupled with the processor; and instructions stored in the memory and executable by the processor to cause the apparatus to perform a method of any of aspects 1 through 15.

Aspect 23: An apparatus for wireless communication at a network node, comprising at least one means for performing a method of any of aspects 1 through 15.

Aspect 24: A non-transitory computer-readable medium storing code for wireless communication at a network node, the code comprising instructions executable by a processor to perform a method of any of aspects 1 through 15.

Aspect 25: An apparatus for wireless communication at a UE, comprising a processor: memory coupled with the processor; and instructions stored in the memory and executable by the processor to cause the apparatus to perform a method of any of aspects 16 through 21.

Aspect 26: An apparatus for wireless communication at a UE, comprising at least one means for performing a method of any of aspects 16 through 21.

Aspect 27: A non-transitory computer-readable medium storing code for wireless communication at a UE, the code comprising instructions executable by a processor to perform a method of any of aspects 16 through 21.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a wide variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communication at a network node, comprising:
   receiving a quality of service request from an edge server that operates according to a first clock configuration that is the same as a second clock configuration for the network node, where in the quality of service request indicates a first time location for a peak in downlink data traffic for a plurality of devices in communication with a communications network comprising the network node;
   transmitting, to the edge server or a data network, a signal that indicates a second time location for the peak in the downlink data traffic for a subset of devices of the plurality of devices based at least in part on a threshold for an overall peak in the downlink data traffic for the plurality of devices; and
   communicating data comprising the downlink data traffic with the subset of devices based at least in part on the signal indicating the second time location.

2. The method of claim 1, wherein determining the first time location comprises:
   receiving a message that establishes communications with the plurality of devices and that indicates a first set of quality of service parameters associated with the plurality of devices; and
   communicating the data with the plurality of devices in accordance with the first set of quality of service parameters.

3. The method of claim 1, wherein determining the first time location comprises:
   establishing communications with the plurality of devices according to a first set of quality of service parameters.

4. The method of claim 3, wherein:
   the quality of service request indicates the first time location, a first quantity of bits of the data at the first time location, a periodicity associated with the first quantity of bits of the data, an arrival phase associated with the first quantity of bits of the data, or any combination thereof; and
   the first time location corresponds to a time common to the network node and a device that transmits the quality of service request.

5. The method of claim 1, wherein transmitting the signal comprises:
   transmitting a quality of service response message that indicates a value of an offset between the first time location and the second time location.

6. The method of claim 5, wherein the offset between the first time location and the second time location is based at least in part on communications parameters associated with the subset of devices.

7. The method of claim 1, wherein transmitting the signal comprises:
   transmitting the signal to the edge server via a network exposure function interface.

8. The method of claim 1, wherein transmitting the signal comprises:
   transmitting the signal to the data network via an interface between a user plane function of the network node and the data network.

9. The method of claim 1, further comprising:
   transmitting the signal to a user equipment (UE) based at least in part on determining the second time location.

10. The method of claim 1, wherein transmitting the signal comprises:
    transmitting a set of signals comprising at least the signal periodically, wherein each signal of the set of signals indicates a respective offset from the first time location for a respective subset of devices of the plurality of devices.

11. The method of claim 1, wherein communicating the data comprises:
    receiving the data from the data network in accordance with the second time location; and
    forwarding the data from the data network to the subset of devices in accordance with the second time location, the data comprising downlink data.

12. The method of claim 1, wherein:
    the threshold for the overall peak in the downlink data traffic corresponds to a threshold quantity of bits of the downlink data traffic for the plurality of devices;
    the peak in the downlink data traffic at the first time location exceeds the threshold; and
    the peak in the downlink data traffic at the second time location is less than the threshold.

13. The method of claim 1, wherein the downlink data traffic comprises downlink data associated with intra-coded frames, predicted frames, or both.

14. A method for wireless communication at a user equipment (UE), comprising:
    communicating signaling via a cross-layer application program interface, wherein the signaling indicates a first time location for a peak in data traffic for the UE;
    transmitting a first signal that indicates the first time location for the peak in data traffic for the UE;
    receiving a second signal that indicates a second time location for the peak in the data traffic based at least in part on a threshold for an overall peak in data traffic for the UE; and
    communicating data comprising the data traffic based at least in part on the second signal indicating the second time location.

15. The method of claim 14, wherein communicating the first time location comprises:
    estimating the first time location based at least in part on communicating the signaling.

16. The method of claim 14, wherein communicating the signaling comprises:

establishing communications between the UE and a device; and receiving, from the device via the cross-layer application program interface, a message that indicates the first time location.

17. The method of claim 14, further comprising:
transmitting, to a device via the cross-layer application program interface, a third signal that indicates the second time location, wherein the communicating is based at least in part on the third signal.

18. The method of claim 14, wherein an offset between the first time location and the second time location is based at least in part on communications parameters associated with a device in communication with the UE.

19. The method of claim 14, wherein the data comprises uplink data, downlink data, or both.

20. An apparatus for wireless communication at a network node, comprising:
one or more processors;
one or more memories coupled with the one or more processors; and
one or more processor-readable instructions stored in the one or more memories and executable by the one or more processors to cause the apparatus to:
receive a quality of service request from an edge server that operates according to a first clock configuration that is the same as a second clock configuration for the network node, where in the quality of service request indicates a first time location for a peak in downlink data traffic for a plurality of devices in communication with a communications network comprising the network node;
transmit, to the edge server or a data network, a signal that indicates a second time location for the peak in the downlink data traffic for a subset of devices of the plurality of devices based at least in part on a threshold for an overall peak in the downlink data traffic for the plurality of devices; and
communicate data comprising the downlink data traffic with the subset of devices based at least in part on the signal indicating the second time location.

21. The apparatus of claim 20, wherein the instructions to determine the first time location are executable by the one or more processors to cause the apparatus to:
receive a message that establishes communications with the plurality of devices and that indicates a first set of quality of service parameters associated with the plurality of devices; and
communicate the data with the plurality of devices in accordance with the first set of quality of service parameters.

22. The apparatus of claim 20, wherein the instructions to determine the first time location are executable by the one or more processors to cause the apparatus to:

establish communications with the plurality of devices according to a first set of quality of service parameters.

23. The apparatus of claim 22, wherein:
the quality of service request indicates the first time location, a first quantity of bits of the data at the first time location, a periodicity associated with the first quantity of bits of the data, an arrival phase associated with the first quantity of bits of the data, or any combination thereof; and
the first time location corresponds to a time common to the network node and a device that transmits the quality of service request.

24. The apparatus of claim 20, wherein the instructions to transmit the signal are executable by the one or more processors to cause the apparatus to:
transmit a quality of service response message that indicates a value of an offset between the first time location and the second time location.

25. An apparatus for wireless communication at a user equipment (UE), comprising:
one or more processors;
one or more memories coupled with the one or more processors; and
one or more processor-readable instructions stored in the one or more memories and executable by the one or more processors to cause the apparatus to:
communicate signaling via a cross-layer application program interface, wherein the signaling indicates a first time location for a peak in data traffic for the UE;
transmit a first signal that indicates the first time location for the peak in data traffic for the UE;
receive a second signal that indicates a second time location for the peak in the data traffic based at least in part on a threshold for an overall peak in data traffic for the UE; and
communicate data comprising the data traffic based at least in part on the second signal indicating the second time location.

26. The apparatus of claim 25, wherein the instructions to communicate the first time location are executable by the one or more processors to cause the apparatus to:
estimate the first time location based at least in part on communicating the data.

27. The apparatus of claim 25, wherein the instructions to communicate the first time location are executable by the one or more processors to cause the apparatus to:
establish communications between the UE and a device; and
receive, from the device via the cross-layer application program interface, a message that indicates the first time location.

* * * * *